(12) United States Patent
Patel et al.

(10) Patent No.: US 12,193,465 B2
(45) Date of Patent: Jan. 14, 2025

(54) MATERIALS AND METHODS FOR EXTENDING SHELF-LIFE OF FOODS

(71) Applicant: JP Laboratories, Inc., Middlesex, NJ (US)

(72) Inventors: Gordhanbhai N. Patel, Somerset, NJ (US); Julia Koleda Nordenbring, Bloomfield, NJ (US)

(73) Assignee: JP Laboratories, Inc., Middlesex, NJ (US)

( * ) Notice: Subject to any disclaimer, the term of this patent is extended or adjusted under 35 U.S.C. 154(b) by 0 days.

(21) Appl. No.: 18/229,757

(22) Filed: Aug. 3, 2023

(65) Prior Publication Data

US 2023/0380457 A1    Nov. 30, 2023

Related U.S. Application Data

(62) Division of application No. 18/225,782, filed on Jul. 25, 2023, which is a division of application No. 17/704,831, filed on Mar. 25, 2022, now Pat. No. 11,737,481, which is a division of application No. 17/578,766, filed on Jan. 19, 2022, now Pat. No. 11,793,220.

(60) Provisional application No. 63/231,890, filed on Aug. 11, 2021, provisional application No. 63/140,160, filed on Jan. 21, 2021.

(51) Int. Cl.
| | |
|---|---|
| *A23L 3/3535* | (2006.01) |
| *A23L 3/3499* | (2006.01) |
| *A23L 3/358* | (2006.01) |
| *A23P 20/15* | (2016.01) |

(52) U.S. Cl.
CPC .......... *A23L 3/3535* (2013.01); *A23L 3/3499* (2013.01); *A23L 3/358* (2013.01); *A23P 20/15* (2016.08)

(58) Field of Classification Search
CPC ...... A23L 3/3535; A23L 3/3499; A23L 3/358; A23P 20/15
USPC .......................................................... 426/310
See application file for complete search history.

(56) References Cited

U.S. PATENT DOCUMENTS

2017/0172141 A1*  6/2017  Bernard ................. A01N 25/00

FOREIGN PATENT DOCUMENTS

| CN | 103960359 A | * | 8/2014 |
| JP | 2004000084 A | * | 1/2004 |
| JP | 2009225698 A | * | 10/2009 |

OTHER PUBLICATIONS

Translation of JP-2004000084-A (Year: 2004).*
Translation of CN-103960359-A (Year: 2014).*
Translation of JP-2009225698-A (Year: 2009).*
Machine English translation of previously cited CN 103960359 A; Applicant: Univ Chengdu; Published Aug. 6, 2014.

* cited by examiner

*Primary Examiner* — Brent T O'Hern
(74) *Attorney, Agent, or Firm* — Joseph T. Guy; Patent Filing Specialist Inc.

(57) ABSTRACT

A food with an extended shelf-life and a method of extending shelf-life of food is provided herein. The extended shelf-life is provided by treating the food with isothiocyanate, a non-aromatic cyclic ketone, a boronic acid, a ligand and their precursors.

4 Claims, 8 Drawing Sheets

(a)

(b)

(a)

(b)

(a)

(b)

(a)

(a1)

(b)

(b1)

MATERIALS AND METHODS FOR EXTENDING SHELF-LIFE OF FOODS

CROSS-REFERENCE TO RELATED APPLICATIONS

This application is a divisional application of U.S. patent application Ser. No. 18/225,782 filed Jul. 25, 2023 which is a divisional application of U.S. patent application Ser. No. 17/704,831 filed Mar. 25, 2022 which is a divisional application of U.S. patent application Ser. No. 17/578,766 filed Jan. 19, 2022 which claims priority to U.S. Provisional Application No. 63/140,160 filed Jan. 21, 2021 and U.S. Provisional Application No. 63/231,890 filed Aug. 11, 2021 all of which are incorporated herein by reference.

FIELD OF THE INVENTION

The present invention is related to extending the shelf-life of foods such as produce; liquid foods, such as milk and juices; and processed foods, such as cheeses, by treating them with cyclic ketones, boronic acids, isothiocyanates and/or chelating agents.

BACKGROUND

Food is a substance consumed to provide nutritional support for animals and humans. Food usually consists of a plant, animal or fungal origin, and contains essential nutrients, such as carbohydrates, fats, proteins, vitamins and minerals. Many plants and plant parts are eaten as food and around 2,000 plant species are cultivated for food. Meat is animal flesh that is eaten as food.

Produce spoils due to many reasons but the major ones are (i) ripening and over ripening, (ii) discoloration or changing colors such as from green to yellow or red, (iii) biological growth such as growth of fungus, and (iv) loss of water which results in loss of crispiness/firmness. The terms, loss of crispness, loss of firmness, wilt, loss of water, dehydration and sweating are used interchangeably herein. Polygalacturonase (PG) activity is largely responsible for pectin depolymerization and solubilization and results in a loss of firmness. Suppression of polygalacturonase activity reduces fruit softening.

Some fruits and vegetables naturally contain the enzyme polyphenoloxidase that, when combined with oxygen in the air, react to cause discoloration or color change. This process begins as soon as the skin or peel of many produce is removed. Apples, pears, bananas, grapes, potatoes, lettuce, and avocadoes are fruits and vegetables that turn brown as the flesh of the produce is exposed to oxygen.

Meat spoils due to a large number of factors with one of the most common being microorganisms such as mold and other bacteria. The term mold is used interchangeably with fungus and microbes such as bacteria and viruses. Microorganisms present in meat cause proteins and fats to break down, spoiling the meat and reaching levels that are unsafe for human consumption. As these microorganisms colonize a piece of meat they begin to break it down, leaving behind toxins that can cause enteritis or food poisoning, which is potentially lethal in the rare case of botulism. A discoloration of meat is yet another vital sign of spoilage. Fresh meat should have a pinkish-red color or be colorless.

The Food and Agricultural Organization (FAO) estimated that food waste causes a global economic, environmental and social cost of $2.6 trillion in 2014. The global dairy market size was valued at US$673.8 billion in 2018, and about 20% of milk and dairy products are wasted. Hence, there is a need to develop a simple process of extending the shelf-life of milk which can eliminate the need for pasteurization and refrigeration.

Preservatives are commonly used in the art for preservation of food. Preservatives are substances or chemicals that are added to products, such as food products, beverages, pharmaceuticals and many other products to prevent decomposition by microbial growth or by undesirable chemical changes. In general, preservation is implemented in two modes, chemical and physical. Chemical preservation involves adding chemical compounds to the product. Physical preservation involves processes, such as refrigeration, freezing, drying, modifying the atmosphere, such as replace air with nitrogen, and vacuum packing. Shelf-life of many produce, such as apples and cucumbers, is extended by wax coating. All kind of materials, devices and processes which extend shelf-life of food, including food preservatives, are also referred to as shelf-life extenders herein.

To prevent sprouting of potatoes materials such as chlorpropham [Isopropyl N-(3-chlorophenyl) carbamate], diisopropyl naphthalene, 1,4-dimethyl-naphthalene, 3-decene-2ene, ethylene, hydrogen peroxide, spearmint oil, peppermint oil, orange oil and maleic hydrazine are reported.

Physical methods for extending shelf-life of juices are reported including microfiltration, high pressure, UV radiation and pulsed electric fields.

In spite of the extensive effort, there remains a strong need for materials and methods suitable for reducing food waste. A particular need is for materials and methods that can be used by small farmers, at home, on almost any produce, on meat and fish, on processed/prepared foods and on liquid foods such as milk and juices. There is also a strong need for materials and methods to reduce food waste by minimizing fungus growth, germination/sprouting and delay ripening of produce.

Provided herein is improved materials and processes for extending the shelf-life of foods.

SUMMARY OF THE INVENTION

It is an object of the invention to provide materials, processes and devices to extend shelf-life of meat, produce, liquid foods and processed foods by reducing development of fungus and bacteria, reducing loss of crispness or water, keeping produce green longer, delaying ripening, and/or reducing sprouting or germination with preservatives such as isothiocyanates, boronic acids, cyclic ketones, chelate ligands or mixtures thereof.

It is another object of the invention to extend shelf-life of foods with preservatives such as isothiocyanates, boronic acids, cyclic ketones, chelate ligands or a mixture thereof.

It is another object of the invention to extend shelf-life of foods with preservatives such as allyl isothiocyanates, ethyl isothiocyanate, butyl boronic acid, phenyl boronic acid, cyclohexanone, 2-cyclohexene-1-one, acetylacetone or a mixture thereof.

A particular feature of the invention to provide processes for exposing or treating foods with shelf-life extenders.

It is another feature of the invention to provide devices such as sachets and micro-capsules for control and on-demand release of preservatives for extending shelf-life of foods.

It is another feature of the invention to provide adducts, complexes, conjugates, or humidity sensitive precursors which release the shelf-life extenders when exposed to water or humidity.

It is another feature of the invention to provide precursors such as thioglucosides, or conjugates of glucose which when exposed to humidity or water produce an isothiocyanate, sulfur-containing organic compounds and sulfur salts of a metal such as Himalayan salt which reacts with water produce hydrogen sulfide and ammonium compounds such as ammonium carbamate which decomposes to ammonia and carbon dioxide with or without moisture under ambient temperature.

It is another feature of the invention to provide an apparatus or a container for exposing a food to a vapor or a sachet of a shelf-life extender or its precursor.

A particular advantage of the invention is the ability to extend the shelf-life of produce by blocking enzymes and other biochemicals which are responsible for the spoilage of foods with the shelf-life extenders.

These and other embodiments of the invention will be realized a food with an extended shelf-life wherein the extended shelf-life is provided by treating said food with at least one shelf-life extender or its precursor selected from a group consisting of an isothiocyanate, a non-aromatic cyclic ketone, a boronic acid, a ligand.

Yet another embodiment is provided in a shelf-life extender or its precursor for treatment of food selected from a group consisting of an isothiocyanate, a non-aromatic cyclic ketone, a boronic acid and a ligand.

Yet another embodiment is provided in a method of extending the shelf-life of food comprising treating the food with a shelf-life extender or its precursor selected from a group consisting of an isothiocyanate, a non-aromatic cyclic ketone, a boronic acid, a ligand.

Yet another embodiment is provided in a method of extending the shelf-life of food comprising treating the food by a method selected from the group consisting of adding a shelf-life extender or its precursor to said food, exposing said food to a vapor of said shelf-life extender, coating said food with said shelf-life extender, releasing said shelf-life extender from a sachet wherein the shelf-life extender is selected from a group consisting of an isothiocyanate, a non-aromatic cyclic ketone, a boronic acid and a ligand.

Yet another embodiment is provided in a method of extending the shelf-life of food comprising a method selected from the group consisting of delaying fungus growth by treating the food with a shelf-life extender or its precursor, delaying germination or sprouting of the food by treating the food with a shelf-life extender, delaying ripening of the food by treating a food with the shelf-life extender and delaying dehydration or wilting of a food by treating the food with a shelf-life extender wherein the shelf-life extender is selected from a group consisting of an isothiocyanate, a non-aromatic cyclic ketone, a boronic acid and a ligand.

DESCRIPTION

Figure 1:
FIG. 1 is a photograph indicating retardation of the growth of fungus on blueberries.
Figure 1:

Provided herein are shelf-life extenders which are particularly suitable for use on produce and particularly fruits, vegetables and meats. The inventive shelf-life extenders inhibit or stop the growth of fungus, improve aging of green produce which can be kept green longer, delay ripening of some fruits, extend the freshness and crispiness of produce, preserve liquid foods such as milk and juices; prevent sprouting or geminating of seeds such as grains, legumes, nuts and root vegetables such potatoes; reduce sweating or perspiration of produce which reduces shriveling, extends the freshness of prepared of processed foods and reduces oxidation and browning. Exemplary shelf-life extenders include isothiocyanates, boronic acids, cyclic ketones, chelating agents and combinations thereof.

Particularly preferred shelf-life extenders are selected from a group consisting of allyl isothiocyanates, ethyl isothiocyanate, butyl boronic acid, phenyl boronic acid, cyclohexanone, 2-cyclohexene-1-one, acetylacetone, ethylene diamine and mixtures thereof.

The method for introducing the shelf-life extenders to the food is not particularly limited however, adding as a solid, spraying, coating, dipping, rinsing or washing in a solution comprising at least one shelf-life extender, pre-exposure to shelf-life extender, controlled release of a solution comprising shelf-life extender, and exposing to a vapor of shelf-life extender are exemplary for demonstration of the invention.

Liquid shelf-life extenders can be added to the foods directly, can be formed as a coating on the food, applied from a solution or applied by exposure to vapors of the shelf-life extenders.

Solid shelf-life extenders can be added in foods by incorporating the shelf-life extender in a solution or by vapor deposition if the solid shelf-life extender sublimes.

Foods can be treated first with methods such as addition, coating, dipping, rinsing and pre-exposure then exposed to a controlled environment with a sachet of the shelf-life extenders.

The food protected by the shelf-life extender can be vegetarian or non-vegetarian. Vegetarian foods include produce, grains, dairy products and processed foods made from produce, grains, and dairy products. Non-vegetarian foods include land dwelling animals and sea food. Process foods include all kind of canned foods and radiated foods.

Produce whose shelf-life can be extended with the shelf-life extenders disclosed herein include edible seeds, cereals, staple foods, legumes, vegetables, climacteric and non-climacteric fruits, leafy & stem vegetables, citrus fruits, carpels, berries, drupes, melons, pears, tropical fruits, flower vegetables, cruciferous vegetables, fruit vegetables, green, leafy vegetables, seed vegetables, root vegetables, tubers, stem vegetables and fungi foods.

Processed foods whose shelf-life can be extended with the shelf-life extenders disclosed herein include dishes and preparations including appetizers, condiments, confectionary, convenient food, desserts, dips, pastes and spreads, dried food, fast foods, fermented foods, baked foods, salads, sandwiches, sauces, snack foods, soups, stews and a large number of peasant and cuisine foods.

Liquid foods whose shelf-life can be extended with the shelf-life extenders include milk, fruit and vegetable juices, extracts, soft drinks and alcoholic drinks such as beers, wines and distilled spirits.

The shelf-extenders disclosed herein can be used for extending shelf-life of meat such as chicken, mutton, pork, beef, camel, horse, emu, alligator, crocodile, turtle, ostrich, duck, deer, zebra, water buffalo, and rabbit.

The shelf-extenders disclosed herein can be used for extending shelf-life of fish and other sea food such as basa, flounder, hake, scup, smelt, rainbow trout, hardshell clam, blue crab, peekytoe crab, spanner crab, cuttlefish, eastern oyster, Pacific oyster, anchovy, herring, lingcod, moi, orange roughy, Atlantic Ocean perch, Lake Victoria perch, yellow perch, European oyster, sea urchin, Atlantic mackerel, Sardines, Black sea bass, European sea bass, hybrid striped bass, bream, cod, drum, haddock, hoki, Alaska pollock, rockfish, pink salmon, snapper, tilapia, turbot, walleye, lake whitefish, wolfish, surf clam, cockle, Jonah crab, snow crab, crayfish, bay scallop, Chinese white shrimp, sablefish, Atlantic salmon, coho salmon, skate, Dungeness crab, king crab, blue mussel, greenshell mussel, pink shrimp, escolar, chinook salmon, chum salmon, American shad, Arctic char, carp, catfish, dory, grouper, halibut, monkfish, pompano, Dover sole, sturgeon, tilefish, wahoo, yellowtail, abalone, conch, stone crab, American lobster, spiny lobster, octopus, black tiger shrimp, freshwater shrimp, gulf shrimp, Pacific white shrimp, squid, barramundi, cusk, dogfish, kingklip, mahimahi, opah, mako shark, swordfish, albacore tuna, yellowfin tuna, geoduck clam, squat lobster, sea scallop, rock shrimp, barracuda, Chilean sea bass, cobia, croaker, eel, blue marlin, mullet, sockeye salmon and bluefin tuna.

The shelf-extenders disclosed herein can be used for extending shelf-life of extracts and fresh juices such as juices or extract of apple, beet, cantaloupe, carrot, celery, cherry, cranberry, coconut water, cucumber, grape, grapefruit, guava, honeydew, kiwifruit, lemonade, lemon, lingonberry, lychee, mango, melon, orange, papaya, pineapple, pomegranate, prune, raspberry, spinach, strawberry, sugarcane, tomato, turnip, fresh and dried herbs and spices and a number of vegetables.

While not limited to theory, it is hypothesized that the inventive shelf-life extenders do so by one or more of the following: reducing oxidation and dehydration, blocking, inhibiting or making inactive the enzymes responsible for degradation of foods, reacting with plant hormones, complexing with biochemicals including those give color to foods such as chlorophyll, anthocyanin, carotenoids, hemoglobin and other naturally occurring coloring agents, and/or have antifungal and antibacterial properties.

For control release of shelf-life extenders, the shelf-life extenders can be microencapsulated or sealed in sachets with proper barrier material. A sachet can have an adhesive layer, preferably that of a pressure sensitive adhesive, on one side so it can be applied inside the food container and a barrier film with a pressure adhesive on the other side of the sachet, so the barrier film can be removed to activate the sachet.

For optimum performance, the concentration of shelf-life extenders, as well as the time and temperature of exposure of foods to shelf-life extenders, are optionally and preferably controlled. High concentrations, high temperature and/or over exposure over a longer time are preferably avoided. High dose can damage the foods. Lower concentrations, low temperatures and/or under exposure over a shorter time are preferably avoided. Low, or insufficient, dose may not be effective in extending shelf-life of foods. The concentration of a shelf-life extender to be used will depend on the type of the food and nature of the shelf-life extenders. Thick skinned produce and those foods which are less permeable to the shelf-life extenders will require a longer time or higher concentration of the shelf-life extenders. Thin produce such as leafy and flowery produce such as parsley, broccoli and flowers will require shorter time of exposure and low concentrations of the shelf-life extenders. Depending upon nature of a shelf-life extender and nature of the food, (i) the concentration of a shelf-life extender in vapor phase can vary from 1 ppb to saturated with vapor of the shelf-life extenders or from 1 ng/ml to 500 mg/ml and from 0.01% to 50% in solution in water or other liquid medium, (ii) time for the treatment can vary from 1 minute to a few days and (iii) temperature can vary from 5° C. to 50° C. When a sachet is used, the concentration of the shelf-life extender can be below 1 ppb and exposure time can be for weeks to a few years for food like grains. When added in a liquid food such as milk and juices or in processed food such as cheeses and canned food, the concentration of the shelf-life extender can vary from 1 ppb to 10%.

Unsaturated shelf-life extenders, having an alkene bond, are more effective and stronger in extending shelf-life of foods than the corresponding saturated homologs. For example, allyl isothiocyanate is more effective than ethyl isothiocyanate in preventing fungus and 2-cyclohexen-1-one is more effective in delaying the ripening of tomatoes. The term ripening also includes over ripening.

Higher humidity helps in reducing the pre-exposure treatment time and concentration of the preservative. The humidity can vary from ambient humidity to 100% relatively humidity. The humidity requirement will depend on food. Ambient humidity can be enough for fumigation of dry grains, herbs and spices while produce may require higher humidity. Depending upon the food, the humidity during the treatment of a food with shelf-life extenders can vary from 1 to 100% relative humidity. As produce perspire, the relative humidity can vary during the treatment. Particularly preferred is a humidity above about 50% relative humidity.

The shelf-life extenders can be added in semi solid foods, gels, foods containing water, process foods, dishes, cuisines, peasant and canned foods to extend their shelf-life.

The shelf-life extenders can be added in can be added in non-food items such as inks, paints and polymers latexes to prevent or minimize fungus.

The shelf-life extenders can be coated, e.g., by spraying non-food solid surfaces to prevent or minimize fungus or other microbial growth such as that of bacteria and viruses. The terms prevent and minimize used interchangeably herein.

The inventive shelf-life extenders can be used alone or it can be added in edible coatings for foods. The inventive shelf-life extender may function as a co-preservative by mixing with preservatives commonly used in the art or reported in the literature as FDA approved and currently used.

The shelf-life extenders can be used as fumigants for the fumigation of grains, legumes, nuts, fruits, dry fruits, herbs and other produce or as co-fumigants.

The shelf-life extenders can be used in pre-harvest applications such as herbicide, insecticide, and pesticides.

Studies demonstrating the effectiveness of the inventive shelf-life extenders of a variety of foods with isothiocyanates, chelate ligands, cyclic ketones and boronic acids with the results presented in Tables 1-6. All studies were conducted at a room temperature of about 25° C. To determine the effectiveness of a shelf-life extender, a control sample which was untreated with any shelf-life extenders, was tested identical to the test samples. Most of the foods changed color or texture. All studies in those Examples of Tables 1-6 were conducted in closed plastic or glass containers. Containers, such as plastic containers, without or with lids having holes can be used if it is advantageous to let excess moisture escape or to prevent condensation of moisture released by some produce.

The following chemicals were also frequently used for extending shelf-life of a variety of foods and found effective to a greater or lesser extent for controlling one or more spoilage criteria mentioned in Example 9: Acetylacetone, allyl isothiocyanate, benzyl ether, 2-butoxyethanol, coumarin, cycloheptanone, cyclohexanone, 2-cyclohexen-1-one, cyclopentanone, dimethyl carbonate, dimethyl maleate, dimethyl malonate, ethylenediamine, hydrogen sulfide, 4-hydroxy-4-methyl-2-pentanone, 2-methyl-8-quinolinol, 2-methylcyclohexanone, 4-methylcyclohexanone, 1-methyl-1-cyclopentene, methyl cyclopentanone-2-carboxylate, and resorcinol.

Delayed or Prevention of Fungus Growth on Produce

On a control sample of blueberries, fungus was observed within 3 days while no fungus was observed even on the $73^{rd}$ day on the sample exposed to the vapor of cyclohexanone from a sachet. Similar results were observed with 2-methylcyclohexanone, allyl isothiocyanate, a mixture of allyl isothiocyanate and cyclohexanone, phenylboronic acid (Examples 22, 91, 94, 95, 117, 138, and 165).

Similarly, the fungus growth was either prevented or significantly delayed on strawberries (Examples 58, 115, 139 & 163), raspberries (Examples 49, 50, 93 & 123), blackberries (Example 169), and lychee (Examples 42 & 98) with allyl isothiocyanate, phenylboronic acid, acetylacetone, 2-methylcyclohexanone, and pieces of ginger. Other shelf-life extenders were also tested with berries.

On a control sample of carrots, fungus started growing within 14 days, while no fungus was observed on the sample soaked in daikon juice (Example 164) under identical conditions. Baby carrots were also tested with cyclohexanone and allyl isothiocyanate as well as solutions of daikon juice, ginger juice and horseradish juice.

On a control sample of cherries, fungus was observed within 2 days while no fungus was observed on the $7^{th}$ day on the sample exposed to the vapor of allyl isothiocyanate with 100% humidity for one hour (Example 24).

On a control sample of young-skinned coconuts, fungus was observed within 11 days, while no fungus was observed on the sample with a sachet of cyclohexanone at 25 days (Example 103).

On a control sample of cucumbers, fungus was observed within 5 days, while no fungus was observed on the $19^{th}$ day on the sample soaked in an aqueous solution of allyl isothiocyanate (Example 31). On a similar sample of cucumbers, fungus started growing within 4 days, while no fungus was observed on the $21^{st}$ day on the samples exposed to cyclohexanone vapor (Example 104) or 1-methylcyclopentene vapor (Example 116).

On a control sample of ginger, fungus was observed within 12 days, while no fungus was observed at 37 days when pre-exposed to the vapor of benzyl ether (Example 146). Ginger was also tested with cyclohexanone, 2-cyclohexen-1-one, acetylacetone, allyl isothiocyanate and ethyl isothiocyanate and found effective. Both the pre-exposure method and sachet method were used. Ginger was also kept in closed as well as open containers.

On a control sample of guar, fungus was observed within 6 days, while no fungus was observed on the sample exposed to allyl isothiocyanate vapor even on the $40^{th}$ day (Examples 38 & 39). While the treated guar did lose its green color slightly but it remained crisp.

On a control sample of horseradish, fungus was observed within 6 days, while no fungus was observed at 19 days when pre-exposed to the vapor of acetylacetone or cyclohexanone (Example 121 & 97). Other preservatives tested with horseradish include: 2-cyclohexen-1-one, allyl isothiocyanate and benzyl ether.

On a control sample of karela (Indian bitter guard), fungus and yellowing was observed within 7 days, while no fungus was observed on the sample exposed to allyl isothiocyanate vapor at 33 days (Example 41).

On a control sample of mandarins, fungus was observed within 14 days, while no fungus was observed at 30 days when soaked in ginger juice solution (Examples 167). Similar results were observed when a piece of wasabi was used as the preservative (Example 168). Mandarins were also exposed to 2-butoxyethanol, dimethyl carbonate, dimethyl maleate, dimethyl malonate, 2-cyclohexen-1-one, and 4-hydroxy-2-butanone and by dipping/rinsing in solution of daikon juice, ginger juice, horseradish juice and allyl isothiocyanate.

On a control sample of white pearl onions, fungus was observed within 8 days, while no fungus was observed at 48 days when a sachet of acetylacetone was placed in a glass jar with 100% relative humidity (Examples 124 & 125). Other preservatives tested on onions include: acetylacetone, cyclohexanone, allyl isothiocyanate, ethyl isothiocyanate, soaking in aqueous ammonium phosphate solution. Similar results were seen with phenyl isothiocyanate (Examples 88 & 87). The fungus growth was either prevented or significantly delayed with the same preservatives on red and yellow pearl onions.

On a control sample of parval (*Trichosanthes dioica*, also known as pointed gourd), fungus and yellowing were observed within 9 days, while no fungus was observed on the sample exposed to allyl isothiocyanate vapor at 16 days (Examples 46, 75 & 76).

On a control sample of snow peas, fungus started growing within 6 days, while no fungus was observed on the $11^{th}$ day on the sample with a hydrogen sulfide (Himalayan salt) sachet (Example 159). Similar results were seen with a sample of snow peas exposed to a piece of ginger (Example 166). Snow peas were also tested with cyclohexanone, daikon piece, ginger piece, horseradish piece, hydrogen sulfide, allyl isothiocyanate, 1-methyl-1-cyclopentene, and 2-cyclohexen-1-one (Example 160).

On a control sample of red ripe tomato, fungus was observed within 13 days, while no fungus was observed at 29 days when exposed to vapor of 2-butoxyethanol (Example 148). Red tomatoes were also tested with 2-butoxyethanol, dimethyl carbonate, dimethyl maleate, dimethyl malonate, 2-cyclohexen-1-one, and 4-hydroxy-2-butanone.

Delayed Fungus Growth on Breads, Dairy, Legumes

On a control sample of puri, an Indian fried bread, fungus was observed within 5 days while no fungus was observed even on the $70^{th}$ day on a sample which was pre-exposed to vapor of allyl isothiocyanate (Example 48) and cyclohexanone (Example 100).

Similarly, the fungus growth was either prevented or significantly delayed on Indian millet bread, Indian wheat bread (roti) (Examples 101, 53 & 141) and cheesecake (Example 99) with cyclohexanone, allyl isothiocyanate and ammonium carbamate in a sachet or pre-exposure to their vapors.

On a control sample of Monterey cheese, fungus was observed within 7 days, while no fungus was observed after 10 days (Examples 45) on Monterey Cheese or Paneer (Indian cottage cheese) (Example 12) with a sachet of allyl isothiocyanate. Similarly, the fungus growth was either prevented or significantly delayed with cyclohexanone with Monterey cheese (Example 102).

On a control sample of raw cheese, fungus was observed within 6 days, while no fungus was observed at 24 days on mozzarella cheese when pre-exposed to the vapor of 2-cyclohexen-1-one (Example 109).

Similar results were seen with allyl isothiocyanate and acetylacetone on raw milk ricotta cheese (Example 122) as well as cheddar cheese (Example 51). Acetylacetone, allyl isothiocyanate and cyclohexanone delayed the growth of fungus on homemade Farmer's cheese (Example 32, 96 and 120). Other raw milk cheeses tested with preservatives include: Colby, gouda, meadowrella, and Swiss. Cyclohexanone and 1-methyl-1-cyclopentene were also tested as shelf-life extenders.

On a control sample of fresh shelled peanuts, fungus was observed within 5 days, while no fungus was observed on the sample treated with allyl isothiocyanate at 8 days (Example 54).

On a control sample of boiled fresh peanuts, fungus was observed within 7 days, while no fungus was observed on the sample with a sachet of cyclohexanone at 16 days (Example 105). Peanuts were treated with cyclohexanone, benzyl ether, coumarin, cycloheptanone, cyclopentanone, 2-methylcyclohexanone, 4-methylcyclohexanone, methyl cyclopentanone-2-carboxylate, 2-methyl-8-quinolinol, 1-nitroso-2-naphthol, 4-nitrosophenol, 8-quinolinol, resorcinol, ammonium acetate, ammonium carbamate, ammonium carbonate, hydrogen sulfide, daikon piece, and horseradish piece.

On a control sample of fresh, raw peanuts, fungus was observed within 5 days, while no fungus was observed on the sample with a sachet of ammonium carbamate at 45 days (Example 142). Similarly, fungus was significantly delayed or prevented with a sachet of allyl isothiocyanate (Example 33).

On a control sample of aqueous gel of gelatin (a food thickener), fungus was observed within 9 days, while no fungus was observed even on the $47^{th}$ day with allyl isothiocyanate (Examples 34 & 35). The fungus growth was either prevented or significantly delayed as well in guar gum and starch (Examples 37, 56 & 57).

On a control sample of tofu, fungus was observed within 6 days, while no fungus was observed at $9^{th}$ day when exposed to a sachet of allyl isothiocyanate (Example 60). Cyclohexanone, hydrogen sulfide, allyl isothiocyanate and ammonium carbonate were effective as shelf-life extenders for tofu.

On a control sample of sprouted mung (*Vigna radiata*) flooded with water, fungus was observed within 7 days, while no fungus was observed at 21 days with a sachet or a drop of allyl isothiocyanate (Example 55 & 173), a mixture of allyl isothiocyanate and cyclohexanone (Example 174) or a drop of 2-cyclohexen-1-one (Example 110). Similar results were observed with a mixture of allyl isothiocyanate and cyclohexanone.

On a control sample of mixed legumes which remained in water, fungus was observed within 11 days, while no fungus was observed at 17 days with allyl isothiocyanate (sachet or pre-exposed to vapor with humidity) (Examples 43, 44, 89 & 172).

Shelf-life extenders which are exemplary for extending shelf-life include cyclohexanone, allyl isothiocyanate, hydrogen sulfide, ammonium carbamate, benzyl ether, 2-butoxyethanol, n-butyl-lactate, butyramide, camphor, cinnamyl alcohol, cycloheptanone, cyclohexanone, 2-cyclohexen-1-one, cyclopentanone, dibutyl adipate, diethyl-tartrate, diethyl malate, acetylacetone, diethyl malonate, diethyl oxalate, diethyl succinate, diethylene glycol monohydrate, dimethyl carbonate, hydrogen sulfide, dimethyl maleate, dimethyl malonate, dimethyl sulfoxide, 2-ethoxyethanol, 2-ethyl-1,3-hexanediol, 4-hydroxy-2-butanone, 4-hydroxy-4-methyl-2-pentanone, 5-hydroxy-2-pentanone, (±)-isoborneol, (−)-menthone, (±)-menthol, (−)-menthol, 2-methoxyethanol, 2-methylcyclohexanone, 4-methylcyclohexanone, naphthalene, 1-nitroso-2-naphthol, 2-phenoxyethanol, 4-phenyl-2-butanone, (−)-β-pinene, 8-quinolinol, salicylaldoxime, ethylenediamine, and acetylacetone.

Delayed Ripening and Keeping Produce and Leafy Vegetables Green Longer

On a control sample of avocados, spoiled flesh was observed on the $7^{th}$ day of cutting open the produce. Spoiled flesh was observed on the $9^{th}$-$11^{th}$ day of cutting open the produce that was exposed to acetylacetone vapor (Example 127 & 128). Spoiling of the flesh with development of fungus, was significantly delayed with preservatives such as allyl isothiocyanate, cyclohexanone, 2-cyclohexen-1-one and a mixture of allyl isothiocyanate and cyclohexanone (Examples 77, 78, 107, 108, 113 & 171).

On a control sample of small bananas, ripening was observed within 18 days, while no ripening was observed at 21 days when exposed to vapor of ethylenediamine (Example 132). Bananas were also tested with cyclohexanone, hydrogen sulfide, ammonium carbamate, cycloheptanone, cyclopentanone, 2-methylcyclohexanone, 4-methylcyclohexanone, (±)-camphor, (−)-menthone, allyl isothiocyanate, acetylacetone and a piece of wasabi.

The ripening, as judged from green-to-yellow (or red) color-change, of green chili peppers (Example 151) and Jalapeno peppers (Example 153) was delayed by pre-dipping into a 10% solution of choline chloride followed by drying.

A control sample of a green tomato turned red on the $10^{th}$ day while green tomatoes pre-exposed to vapor of cyclohexanone took 18 days to turn red (Example 106). Color change from green-to-red was also significantly delayed with acetylacetone (Example 126).

On a control sample of mangoes, ripening occurred within 16 days, while mangos treated with a sachet of dimethyl maleate did not ripen until 23 days (Example 156). Similar results were seen when exposed to vapors of 2-ethoxyethanol (Examples 157).

On a control sample of papaya, ripening occurred within 7 days, while papaya pre-exposed to the vapor of 2-cyclohexen-1-one was delayed by at least 11 days (Example 112). Papaya was also tested with cyclohexanone, acetylacetone, dimethyl maleate as well as a mixture of cyclohexanone and acetylacetone.

The delay of ripening and turning red from green was achieved for tindora (*Coccinia grandis*, the ivy gourd) (Examples 15, 59 & 170) with allyl isothiocyanate as well as a mixture of allyl isothiocyanate and cyclohexanone. Tindora was treated with cyclohexanone, daikon piece, ginger piece, horseradish piece, hydrogen sulfide, allyl isothiocyanate, wasabi, 2-butoxyethanol, dimethyl carbonate, dimethyl maleate, dimethyl malonate, 2-cyclohexen-1-one, 4-hydroxy-2-butanone, 1-methyl-1-cyclopentene, benzyl ether, n-butyl lactate, butyramide, camphor, cinnamyl alcohol, cycloheptanone, cyclohexanone, cyclopentanone, dibutyl adipate, diethyl L-tartrate, diethyl malate, acetylacetone, diethyl malonate, diethyl oxalate, diethyl succinate, diethylene glycol monohydrate ether, dimethyl sulfoxide, 2-ethoxyethanol, 2-ethyl-1,3-hexanediol, 4-hydroxy-4-methyl-2-sentanone, 5-hydroxy-2-pentanone, (±)-isoborneol, (−)-menthone, (±)-menthol, (−)-menthol, 2-methoxyethanol, 2-methylcyclohexanone, 4-methylcyclohexanone, naphthalene, 1-nitroso-2-naphthol, 2-phenoxyethanol, 4-phenyl-2-butanone, (−)-β-pinene, 8-quinolinol, and salicylaldoxime. Tindora has also been dipped in allyl isothiocyanate solution which demonstrated shelf-life extension.

Expedited Ripening

On a control sample of mango, ripening occurred around 14 days, while on a sample exposed to dimethyl carbonate, ripening was expedited at 8 days (Example 155). Similar results were observed with a sachet of 2-butoxyethanol (Examples 147).

Keeping Leafy Vegetables Green Longer

Bok choy (Example 149) remained green longer than the respective control samples when pre-dipped into a solution of 22% choline chloride.

On a control sample of fresh green chickpeas, a green-to-yellow color change was observed within 7 days, while no color changed was observed at 9 days on a sample treated with an allyl isothiocyanate sachet (Example 30).

On a control sample of green coriander, browning, yellowing, and/or wilting was observed within 11 days, while a sample exposed to acetylacetone vapor remained green past 21 days (Example 130). Spoilage of coriander was significantly delayed by the vapors of allyl isothiocyanate, cyclohexanone, 2-cyclohexen-1-one as well as soaking in 1% solution of mandelic acid (Examples 11, 92, 114 and 161).

On a control sample of limes, color change from green to brown on the skin was observed within 6 days, while no color change was observed on the sample sprayed with a 2% phenylboronic acid solution in water (Example 137) at room temperature after 10 days.

On a control sample of green methi (fenugreek), wilting was observed within 9 days, while a sample exposed to allyl isothiocyanate vapor remained fresh and green at days (Example 83).

On a control sample of green parsley, browning, yellowing and/or wilting was observed within 7 days while a sample exposed to acetylacetone vapor remained fresh and green at 21 days (Example 119). Browning, yellowing and/or wilting was significantly delayed with ethylenediamine (Example 131). In addition, pre-dipping/rinsing in 22% solution of choline chloride has delayed the color change in parsley (Example 150).

In order to keep leafy vegetables green longer, cyclohexanone, daikon piece, ginger piece, horseradish piece, hydrogen sulfide, allyl isothiocyanate, acetylacetone, ethylenediamine, wasabi, 2-butoxyethanol, dimethyl carbonate, dimethyl maleate, dimethyl malonate, 2-cyclohexen-1-one, 4-hydroxy-2-butanone, and 1-methyl-1-cyclopentene were tested. Roots of coriander were dipped in the following solutions: magnesium phosphate dibasic, propyl gallate, ammonium dihydrogen phosphate, calcium acetylacetonate, diethylene glycol monoethyl ether, ethylenediaminetetraacetic acid-sodium salt, malic acid, mandelic acid and pyrogallic acid.

Delayed Color Change of Flowery Vegetables

On a control sample of broccoli, color change from green-to-yellow was observed within 5 days, while a sample treated to vapors of allyl isothiocyanate remained green at 16 days (Example 25 & 27). Similar results were observed when the sachet method was used (Example 26). Color change was also significantly delayed when broccoli was dipped into a 5% solution of choline chloride (Example 152).

On a control sample of cauliflower, fungus was observed at 2 days while no fungus was observed at 4 days when a control sample was exposed to the vapors of allyl isothiocyanate (Example 29).

Flowery vegetables were demonstrated to have an extended shelf-life when treated with shelf-life preservatives selected from cyclohexanone, ammonium carbamate, ammonium carbonate, cycloheptanone, cyclopentanone, 2-methylcyclohexanone, 4-methylcyclohexanone, (±)-camphor, (−)-menthone, allyl isothiocyanate, acetylacetone, 1-methyl-1-cyclopentene, and 2-cyclohexen-1-one and hydrogen sulfide.

Delaying or Prevention of Sprouting/Germination of Tubers and Grains

On a control sample of presoaked and strained mixed legumes germination was observed within 4 days, while no germination was observed at 21 days after exposure to vapors of allyl isothiocyanate from a sachet or in solution (Examples 66, 67, 68 & 111). Similarly, the germination was also delayed or prevented with 2-cyclohexen-1-one.

On a control sample of grains which were mainly unhusked rice and soft white wheat, germination/sprouting was observed within 2 days, while no germination/sprouting was observed after 10 days on a sample treated with a 2% phenylboronic spray (Example 140).

On a control sample of pre-soaked and strained unshelled rice, germination was observed within 3 days, while no germination or fungus was observed at 15 days with exposure to a sachet of allyl isothiocyanate (Example 71). Similarly, germination or fungus was delayed or prevented with mixed legumes and sprouted legumes.

On a control sample of flooded shelled peanuts, germination and/or fungus was observed within 5 days, while no germination and/or fungus was observed for 8 days the sample was exposed to a drop of allyl isothiocyanate in flooded water. Germination and/or fungus was also either prevented or significantly delayed with similar conditions in unshelled peanuts (Example 62). The shelf-life of shelled and unshelled peanuts was also extended with cyclohexanone, 2-cyclohexen-1-one and 1-methyl-1-cyclopentene.

On a control sample of sprouted garlic, the growth of sprouts continued while no further growth of sprouts was observed on a sample exposed to vapor of allyl isothiocyanate (Example 82).

On a control sample of potatoes, sprouting was observed within 8 days while no sprouting was observed at 48 days when exposed to a sachet of acetylacetone (Example 129). Similarly, sprouting was either prevented or significantly delayed on various types of potatoes when exposed to allyl isothiocyanate vapor or a sachet comprising allyl isothiocyanate (Examples 79-81) as well as by pre-dipping into 10% choline chloride solution (Example 154). Other preservatives effective at extending the shelf-life of potatoes included cyclohexanone, ethyl isothiocyanate, phenyl isothiocyanate, soaking in water and an ammonium phosphate solution.

Keeping Grains and Legumes from Disintegration with Water

On a control sample of pre-soaked and strained white rice, softening/mushiness and an odor were observed within 5 days while no softening/mushiness or a bad order was observed at 21 days with a pre-soaked white rice exposed to as solution or a sachet of allyl isothiocyanate (Example 72 & 73). Similar results were observed with pre-soaked soft white wheat and wild rice (Examples 63, 64, 69, & 70).

Other tubers we tested for preventing sprouting and fungus with the shelf-life extenders include turnip, ginger, yautia eddoes (American taro), beet, carrot, garlic, ruby small potatoes, yellow mini potatoes, white criollo potato, gold potatoes, red potatoes, russet potatoes, sweet potatoes, red onion, yellow onion, white onion, gold pearl onion, red pearl onion, white pearl onion and shallots.

Liquid Foods

On a control sample of pasteurized milk, curdling was observed within 2 days, while no curdling was observed on a sample comprising one to two drops of allyl isothiocyanate in 200 g of milk at 28 days (Example 19). Similar results were observed with additional drops of ethyl isothiocyanate (Example 17). Curdling was either prevented or significantly delayed as well in fat-free milk with 3-chlorophenylboronic acid (Example 135) and ethyl isothiocyanate in whole milk (Example 86), and fat-free milk.

Other preservatives tested with both pasteurized whole and fat-free milk which delayed curdling of milk include: 4-biphenylboronic acid, boric acid, 4-bromophenylboronic acid, butylboronic acid, 4-tert-butylphenylboronic acid, 3-chlorophenylboronic acid, 3,5-dimethylphenylboronic acid, 4-(methoxycarbonyl)phenylboronic acid, 3-methoxyphenylboronic acid, 2-methylphenylboronic acid, and phenylboronic acid.

On a control sample of raw cow milk, curdling was observed within 3 days, while no curdling was observed on a sample with one to two drops of allyl isothiocyanate in 200 ml of milk as well as with ethyl isothiocyanate at 24 days (Example 16). Other preservatives tested with raw cow milk and raw goat milk which delayed curdling include: benzyl isothiocyanate, butyl isothiocyanate, phenyl isothiocyanate, p-tolyl isothiocyanate, 4-biphenylboronic acid, 4-bromophenylboronic acid, butylboronic acid, 4-tert-butylphenylboronic acid, 3,5-dimethylphenylboronic acid, 4-(methoxycarbonyl)-phenylboronic acid, 2-methoxyphenylboronic acid, 3-methoxyphenylboronic acid and 3-chlorophenylboronic acid.

On a control sample of a mixture of beaten yogurt and pasteurized milk mixture, curdling was observed within 2 days, while no curdling was observed on a sample with one drop of allyl isothiocyanate at 16 days (Example 18).

On a control sample of raw milk yogurt, fungus was observed within 3 days, while no fungus was observed at 5 days with 4-bromophenylboronic acid added (Example 134). Other preservatives which demonstrated extended shelf-life with raw milk yogurt include: allyl isothiocyanate, ethyl isothiocyanate (Example 84), butylboronic acid, 4-tert-butylphenylboronic acid and 3-chlorophenylboronic acid.

Keeping Cold-Pressed Fruit Juices Fresh Longer

On a control sample of fresh cold-pressed orange juice, fungus was observed within 4 days, while no fungus was observed at 27 days with a drop of 3-methoxyphenylboronic acid (Example 136). On a control sample of fresh cold-pressed green grape juice, fungus was observed within 7 days, while no fungus was observed at 30 days with a drop of allyl isothiocyanate in the juice (Example 36). Fungus growth was either prevented or significantly delayed as well in fresh cold pressed pomegranate juice, blackberry juice, orange juice, red grape juice, apple juice, blueberry juice and honeydew juice with allyl isothiocyanate (Examples 14, 20, 23, 40, 47, 52, and 65). Preservatives tested which were effective in extending freshness of cold press fresh juices include butyl isothiocyanate, phenyl isothiocyanate, 4-bromophenylboronic acid, 3-chlorophenylboronic acid, 3,5-dimethylphenylboronic acid, 4-(methoxycarbonyl)-phenylboronic acid, 2-methoxyphenylboronic acid, 4-biphenylboronic acid and butylboronic acid.

On a control sample of fresh cold pressed tomato juice, fungus was observed within 3 days, while no fungus was observed at 20 days with a drop of allyl isothiocyanate in the juice (Example 61). Ethyl isothiocyanate and 4-tert-butylphenylboronic acid were also demonstrated to improve shelf-life on tomato juice (Example 85 & 133). The fungus growth was either prevented or significantly delayed as well in fresh cold pressed carrot juice, red cabbage juice, and beet juice (Examples 28, 21, 13). Other fresh, cold pressed vegetable juices demonstrating improved shelf-life with allyl isothiocyanate include tomatillo, lime, and green cabbage.

Color Loss of Meat and Fish

On a control sample of ground beef a loss of pinkish fleshy color was observed within 2 days. A sample with a sachet of ammonium carbamate had lost less fleshy pinkish color, on $3^{rd}$ day. Similar results were observed with ground chicken and tilapia filets (Examples 143-145). Cyclohexanone, hydrogen sulfide, allyl isothiocyanate and ammonium carbonate also demonstrated improvements with meat and fish.

Keeping Flowers Longer

On a control sample of cut lilies with stems dipped in water, petals began to turn brown within 4 days and its petals had fallen by 12 days, while on a sample dipped in acetylacetone solution was still fresh and alive at 12 days (Example 118). Other preservative tested with flowers include: cyclohexanone, 2-cyclohexen-1-one, 1-methyl-1-cyclopentene, 3-methoxyphenylboronic acid, 3-chlorophenylboronic acid, benzyl ether, choline chloride and hydrogen sulfide. Flowers can be exposed to very low concentration, e.g., in ppm, of vapor of the shelf-life extenders to keep them fresher longer. Other flowers demonstrated improved shelf-life include: marigold, salvia, vinca, daffodils, gerbera, roses, carnations, pompoms, alstroemeria, baby's breath, hydrangea, large tree leave, small tree leave, green vines, lavender, small purple and red garden flowers, walnut leaves, clovers, mug wort, pokeweed, chamomile, *allium*, yarrow, bee balm, daisy, tradescantia, malva and clematis multi blue.

Dehydration/Wilting of Radish

On a control sample of radish, dehydration/wilting was observed within 5 days, while less dehydration/wilting was observed on a sample exposed to (−)-menthone vapor (Example 162).

Rising of Dough

On a control sample of freshly prepared dough, rising could continuously be observed throughout the day. However, freshly prepared dough with allyl isothiocyanate added did not rise (Example 74). While the percent of allyl isothiocyanate was not optimized the results indicate that allyl isothiocyanate is capable of killing yeast and may also kill other bacteria and viruses.

Color Change of Sliced Apple

The control sample of cut pieces of Granny Smith apple started turning brown within hours while a sample exposed to hydrogen sulfide produced from reaction of humidity of cut apple with Himalayan salt, did not turn brown even on the 3rd day (Example 158).

List of Types of Foods Whose Shelf-Life can be Extended with the Shelf-Life Extenders The parts of the vegetable plant that can have an extended shelf-life when treated with the shelf-life extenders include those parts that we eat include the leaves, fruit, stems, roots, tubers, seeds, flowers, legumes, edible fungi, edible nuts and seeds, dairy products, eggs, meat, cereals and sea food are considered basic foods. Specific examples of foods whose shelf-life can be extended with the shelf-life extender includes edible seeds, cereals, staple foods, legumes, vegetables, climacteric and non-climacteric fruits, leafy and stem vegetables, citrus fruits, carpels, berries, drupes, melons, pears, tropical fruits, fruit vegetables, flower vegetables, cruciferous vegetables, green, leafy vegetables, seed vegetables, root vegetables, tuber vegetables, stem vegetables, fungi foods, seafood, dairy products, fresh food, processed foods, yogurt and curd, peasant foods, cuisines, baked foods, yeast, fruit juices, canned and bottled foods and liquid foods.

Edible seeds include cereals such as corn, wheat, rice, etc.; legumes such as beans, peas, lentils, etc.; and nuts. Oil seeds such as peanut, cotton seed, sunflower, flaxseed, rapeseed including canola oil, and sesame are often pressed to produce oils.

Cereals are the seeds of certain species of grass. Maize/corn, wheat, and rice account for about half of the calories consumed by people every year. Grains can be ground into flour for bread, cake, noodles, and other food products.

A staple food is a food that is eaten routinely and in such quantities that it constitutes a dominant portion of a standard diet, supplying a large fraction of the needs for energy-rich materials and generally a significant proportion of the intake of other nutrients as well. Most staple plant foods are derived either from cereals such as wheat, barley, rye, maize, or rice; or starchy tubers or root vegetables such as potatoes, yams, taro, and cassava. Other staple foods include pulses such as dried legumes, sago derived from the pith of the sago palm tree, and fruits such as breadfruit and plantains.

Legumes include beans and lentils or generally pulses. Well-known legumes include alfalfa, clover, peas, beans, lentils, mungs, lupins, mesquite, carob, soybeans, red beans, black eye bean, and chickpeas.

Vegetables are commonly eaten as food. These include root vegetables such as potatoes and carrots, bulbs such as the onion family, leaf vegetables such as spinach and lettuce, stem vegetables such as bamboo shoots and asparagus, and inflorescence or flowery vegetables such as globe artichokes or broccoli and other vegetables such as cabbage or cauliflower.

Climacteric are those fruits which continue to ripen after harvesting and non-climacteric fruits are those fruits which do not ripen further after harvest. Examples of climacteric fruits are apple, banana, mango, papaya, pear, apricot, peach, plum, avocado, guava, passion fruit, blue berry and cantaloupe. The examples of non-climacteric are grape, lime, lemon, orange, raspberry, strawberry, cashew nut, pineapple, water melon, pomegranate and lychee.

Leafy vegetables include lettuce, cabbages such as Chinese cabbage, Brussels sprouts, rhubarb, celery, spinach, chard, kale, endive, escarole, green onions, chicory, radicchio, and other leafy greens, stem vegetables include asparagus, kohlrabi, and fennel and floral vegetables include artichokes, broccoli, and cauliflower. Other leafy produce are amaranth, arugula, beets, basil, chervil, chives, cilantro, cress, endive, fennel, garlic, lavender, mint, mustard, nutmeg, onion, parsley, coriander, fenugreek, radicchio, radish, spinach, sorrel and mint.

Citrus fruits are characterized by thick skins, aromatic oils, and segmented flesh. They are abundant in vitamin C. The most common citrus fruits are oranges, grapefruits, lemons, limes, tangelos, and tangerines. The flavor of citrus fruits ranges from very sweet oranges to very tart and sour lemons.

Carpels are semi-transparent pods that contain seeds near the core. Examples are apples such as Red and Golden Delicious, Jonathan and Granny Smith, McIntosh, Rome and Winesap apples.

Berries are highly perishable, tender and fragile. Varieties include blueberries, raspberries, blackberries, boysenberries and strawberries. Grapes are technically berries that grow in clusters on vines.

Cherries, along with plums, peaches, nectarines and apricots are called drupes. Drupes have a central pit enclosing a single seed.

Popular melons are honeydew and cantaloupe or muskmelon. Characterized by their tan, green, or yellow skin wherein the rind is tough and the flesh is flavorful. The network of seeds in the middle are taken out before eating. Unlike sweet melons, watermelons have a smooth, thick green skin and are often much larger in size. The seeds are scattered throughout the melon. Plums have a firm flesh and range in shades of green, red, and purple.

Pears have a sweet taste and a smooth juicy flesh. Common varieties are Bartlett, Bosc, or d'Anjou (small dark red or green). Pears are often picked early, while the flesh is still very firm and grainy.

Tropical fruits are named for the climatic conditions under which they grow, and include figs, dates, kiwis, mangos, bananas, papayas, pomegranates, passion fruit, pineapple and coconuts. Bananas are high in nutrients and are picked green and allowed to ripen during transport.

In flower vegetables, the flower or floret part of the plant and the stems are eaten. Only the tender flesh at the base of each globe artichoke outer leaf is eaten. Artichokes are sometimes considered a stem vegetable. Cabbage has thick and waxy leaves.

Allyl isothiocyanate and other isothiocyanates, such as benzyl isothiocyanate, sulforaphane and phenylethyl isothiocyanate are food components. They exist in various produce, especially cruciferous vegetables. Cruciferous or *Brassica* vegetables are so named because they come from plants in the family known to botanists and biologists as Cruciferae or alternately, Brassicaceae. Many, but not all, commonly consumed cruciferous vegetables come from the *Brassica* genus; examples include broccoli, Brussels sprouts, cabbage, cauliflower, collard greens, kale, kohlrabi, mustard, rutabaga, turnips, bok choy, and Chinese cabbage. Examples of other edible crucifers include radish (*Raphanus sativus*), horseradish (*Armoracia rusticana*), watercress (*Nasturtium officinale*), wasabi (*Wasabia japonica*), and Swiss chard (*Beta vulgaris flavescens*). We also eat processed food such as yellow mustard condiment in form of paste or sauce wasabi coated nuts, especially soya beans and peanuts and many of the Asian/Indian dishes are sautéed with black/brown mustard seeds. Most of us consume one or more of these produce in varied amount almost every day. They have taste of mustards or wasabi.

Avocados have leathery green or black skin with a buttery flavor. Guacamole is a traditional Mexican dip using mashed avocados as the main ingredient. Slicing cucumbers have smooth skins and are long, round cylinders with a high-water content. Eggplant is a pear-shaped, purple-black vegetable with a glossy skin and firm flesh. Asian eggplant, a slenderer variety, is typically sweeter.

Bell or sweet peppers are named for their shape. All varieties start out green, and change colors to red, green, yellow, cream, purple or red as they ripen. Chili peppers are smaller and hotter. The seeds are the hottest part. Tomatoes are a type of berry, ranging in color from green, to yellow, to bright red.

Butternut, acorn, spaghetti, banana, hubbard, and pumpkin are types of winter squash. Crookneck, and zucchini are types of summer squash with soft skin and smaller seeds that can both be eaten.

The light-green leaves of iceberg lettuce are tightly packed together with the heaviest heads being the most compact. Both romaine and leaf lettuce are loosely packed with the leaves growing upward in bunches and their edges are slightly ruffled. There are several types of 'greens' used in cooking, including mustard greens, escarole, and spinach. They usually have a more bitter, stronger flavor than the lettuces and are very high in nutrients.

Seed vegetables include green beans, green legumes, yellow wax beans, Fava Beans, Lima Beans and French haricot verts. They are all eaten in the pod. Corn and popcorn, grown for its small ears and pointed kernels that explode when heated. Once the seed vegetables are picked, they begin to convert their natural sugars to starch. They lose their sweetness.

Root vegetables are plants that have a single, large edible root that extends down into the ground and provides nutrients to the part of the plant above ground. The leaves and root of beets are both edible. Large beets may have a woody texture. Pickled beets are zesty. Peppery-flavored radishes range in color from bright reds to pale cream, making them a good garnish. When young and fresh, half-white, half-purple turnips range in flavor from very sweet to a little peppery; older ones can be hot and bitter. Carrots contain a large amount of carotene, a pigment easily convertible to vitamin A.

Flattened yellow onions are the most common and the least expensive and are used for most recipes and for onion rings. Very round yellow, red, and white onions are less "hot", somewhat sweeter and crisper. All varieties have a pungent flavor and aroma and are used as seasonings. Pearl onions have very small bulbs. Green onions, also called scallions, are common onions pulled when immature. Leeks look like large green onions. They have the mildest flavor of all onions. Mild-flavored shallots are shaped like small bulb onions, but separate into cloves when broken apart. Garlic is separated into cloves and peeled.

Tubers are enlarged, bulbous roots capable of generating a new plant. They are actually fat, underground stems. Like several of the seed vegetables, these are high in starch. Potatoes are the most popular vegetable and very versatile, able to be prepared by baking, boiling, frying, deep-frying, and microwaving. Sweet potatoes have a darker flesh than a white potato due to a higher sugar content. The thick skin is not usually eaten. Yams are similar to sweet potatoes, but not as sweet. Its flesh ranges in color from deep red to creamy white.

Celery has a high-water content and is very crisp. The 'bunch' is called a stalk. An individual piece is called a rib.

The "relish tray" has become standard fare on many tables and buffets. Raw vegetables, including cucumbers that have been made into sweet and dill pickles, and olives; which can be black, green, stuffed, etc.; are high in nutrients and very colorful.

Some foods not from animal or plant sources include various edible fungi, especially mushrooms. Mushrooms are a family of 'fungi'. Portabella is the largest mushroom with a meaty flavor. Fungi and ambient bacteria are used in the preparation of fermented and pickled foods like leavened bread, alcoholic drinks, cheese, pickles, kombucha, and yogurt.

Seafood is any form of sea life regarded as food by humans. Seafood prominently includes fish and shellfish. Shellfish include various species of mollusks, crustaceans, and echinoderms.

Dairy products such as milk, yogurt and cheese are fresh and spoil quickly.

Fresh food is food which has not been preserved and has not spoiled yet. For vegetables and fruits, this means that they have been recently harvested and treated properly postharvest. For meat, fresh food has recently been slaughtered and butchered. For fish, fresh fish has been recently caught or harvested and kept cold.

Processed foods include a large number of dishes and preparations including appetizers, condiments, confectionary, convenient food, desserts, dips, pastes and spreads, dried food, fast foods, fermented foods, salads, sandwiches, sauces, snack foods, soups, stews and a large number of peasant and cuisine foods.

Yogurt is prepared using techniques similar to making curd but the fermentation of the milk is done by adding two specific strains of bacteria called *Lactobacillus* bulgaris and *Streptococcus thermophilus*. Other strains of lactic acid bacteria may also be added. The addition of these bacteria makes the product standardized and homogenous. This ensures both the quality as well as the right quantity of bacteria is in the yogurt. Also, more of the good bacteria reaches the intestines alive.

Curd is made by boiling and cooling the milk to 30-40° C. and adding a spoonful of curd. Curd has lactic acid bacteria or *Lactobacillus*. This bacterium multiplies itself in the ambient temperature of 30-40° C. and in few hours ferments the milk to form curd.

Yogurt is a well-known probiotic food. Yogurts contain *Lactobacillus* and *Streptococcus* bacteria species. Many different bacteria can be found in yogurt but all yogurts contain the bacteria *Lactobacillus bulgaricus* and *Streptococcus thermophilus*. According to the National Yogurt Association's guidelines, the final products have to contain a minimum of 100 million live cultures per gram. There are many other sources of healthy bacteria e.g., fermented foods, such as miso paste, tofu, buttermilk and some pickled vegetables.

Peasant foods are dishes specific to a particular culture, made from accessible and inexpensive ingredients, and usually prepared and seasoned to make them more palatable. Peasant and cuisine foods are also referred herein as processed foods.

Many cultures have a recognizable cuisine, a specific set of cooking traditions using various spices or a combination of flavors unique to that culture, which evolves over time. Some popular types of ethnic foods include Italian, French, Japanese, Chinese, American, Thai, African, and Indian.

Baked foods include bread and other food prepared by backing dough of grains, such as wheat. Middle East bread, called pita or pocket bread, and Indian breads, call rotis, are exemplary.

Yeast is a form of fungi and it occurs in almost any environment capable of supporting microbes from the skins of fruits to the guts of insects and mammals to the deep ocean. Yeasts convert, or break down, sugar-rich molecules to produce ethanol and carbon dioxide. Yeasts are very common in the environment and are often isolated from sugar-rich materials. Yeasts are eukaryotic, single-celled microorganisms classified as members of the fungus kingdom. Most yeast reproduces asexually by mitosis and many do so by the asymmetric division process known as budding.

The yeast species *Saccharomyces cerevisiae* converts carbohydrates to carbon dioxide and alcohols in a process known as fermentation. The products of this reaction have been used in baking and the production of alcoholic beverages. Yeasts vary in regard to the temperature range, such as 4° C. to 45° C., in which they grow best. The cells can survive freezing under certain conditions.

Cold pressed and other fresh fruit juices have limited shelf-life. As the addition of allyl isothiocyanate extends the shelf-life of milk by many folds, it is highly likely that isothiocyanates such as allyl isothiocyanate will extend shelf-life of most fruit juices.

Once opened, most of the canned and bottled liquid and solid foods have limited shelf-life.

Liquid foods include milk, fruit and vegetable juices, soft drinks, alcoholic drinks such as beers and wines.

Naturally occurring foods are composed a large number of biochemicals and many, such as enzymes, are very complex molecules. There are thousands of plant and animal derived foods and possibly a greater number of processed foods including peasant and cuisine foods. It is impossible to determine the exact mechanism how the shelf-life of these foods is extended with shelf-life extenders disclosed and demonstrated herein. It is likely that the compositions disclosed herein for extending shelf-life of foods are reducing oxidation and dehydration, blocking or making the enzyme inactive, complexing with biochemicals such as chlorophyl and hemoglobin, and/or have antifungal and antibacterial activities.

Compositions that can be Used to Extend Shelf-Life of Foods

Shelf-life extenders are preferably selected from a group consisting of isothiocyanates, ligands, hydrogen sulfide ($H_2S$), non-aromatic ketones, non-aromatic nitriles, boronic acids and their precursors.

We have been able to extend the shelf-life of a large number of foods with isothiocyanates, boronic acids, chelating agents and cyclic ketones. The shelf-life extenders function by: preventing or minimizing growth of fungus, delaying ripening of fruits and vegetable, keeping produce green longer, reduce wilting, minimizing spoiling of fresh juices, delaying the curdling of milk or by reducing or prevent sprouting and germination of tubers and grains.

We have been able to do the above mainly with a small number of preservatives such as isothiocyanates, boronic acids, cyclic ketones, chelate ligands or mixture thereof. Particularly preferred shelf-life extenders are selected from a group consisting of allyl isothiocyanates, ethyl isothiocyanate, butyl boronic acid, phenyl boronic acid, cyclohexanone, 2-cyclohexene-1-one, acetylacetone or a mixture thereof.

A thiocyanate shares its negative charge approximately equally between sulfur and nitrogen. As a consequence, thiocyanate can act as a nucleophile at either sulfur or nitrogen and is therefore an ambidentate ligand. Thiocyanate ion ($SCN^-$) can also bridge two (M-SCN-M) or even three metals (>SCN— or —SCN<).

In coordination chemistry, ligands are an ion or molecule comprising a functional group that binds to a central metal ion to form a coordination complex. The bonding with the metal generally involves a formal donation of one or more of the ligand's electron pairs often through Lewis Bases. The nature of metal-ligand bonding can range from covalent to ionic. In general, ligands are viewed as electron donors and the metals as electron acceptors and are respectively, Lewis bases and Lewis acids. A chelate or complex is a compound containing a central atom bonded with surrounding ligands. Complexes of polydentate ligands are called chelate complexes. They tend to be more stable than complexes derived from monodentate ligands.

Examples of common ligand classes and specific examples are: Iodide, bromide, sulfide, thiocyanate, chloride, nitrate, azide, fluoride, hydroxide, oxalate, nitrite, Isothiocyanate, acetonitrile, pyridine, ammonia, ethylenediamine, bipyridine, 1,10-phenanthroline, nitrite, triphenylphosphine, cyanide, carbon monoxide, acetylacetone, aminopolycarboxylic acids, cryptates, cyclopentadienyl, diethylenetriamine, dimethylglyoxime, diethylenetriaminepentaacetic acid, ethylenediamine, ethylenediaminetetraacetic acid (EDTA), ethylenediaminetriacetate, glycinate, nitrosyl, nitrilotriacetic acid, mono and polyphenols, sulfite and triethylenetetramine.

Ligands that can be used to keep produce green longer or added sometimes before harvesting to keep produce green longer are aspartic acid, 4-tert-butylpyrocatechol, catechol, citric acid, 2,3-dihydroxynaphthalene, 2,4-dihydroxybenzophenone, diethylene glycol dimethyl ether, dimethyl glyoxime, ethylene diamine, ethylene diamine-acetic acid, salts of ethylene diamine and its salts, ethylene diamine tetra acetic acid and its salts such as that of sodium, potassium and ammonium, gallic acid, glutamic acid, histidine, lactic acid, maleic acid, malic acid, mandelic acid, oxalic acid, 1,10-phenanthroline, gallates such as propyl gallate, pyrogallol, salicylic acid, thioglycolic acid and 2,3,4-trihydroxybenzophenone. The acid also can be in form of salts.

There are many weak ligands which form a complex with many metals including thiocyanates and isothiocyanate.

Other ligands which function as chelates include 1,3-dicarbonyls, R—C(O)—$CH_2$—C(O)—R, where R typically is an alkyl group are good chelating agents. Examples of 1,3-dicarbonyls are acetylacetone, 2,3-butanedione, 2,3-pentanedione, and 2,3-hexanedione, trifluoroacetylacetone, and hexafluoroacetylacetone.

Hydrogen sulfide and precursors include black salt which is a type of rock salt, a salty and pungent-smelling condiment used in the South Asia. It is also known as Himalayan black salt. The smell is mainly due to its sulfur content. It consists primarily of sodium chloride and trace impurities of sodium sulfate, sodium bisulfate, sodium bisulfite, sodium sulfide, and iron sulfide. When water is added to dissolve it or exposed to humidity, these sulfur compounds and Himalayan black salt produce hydrogen sulfide which is a gas.

Non-aromatic cyclic ketones that can potentially be used as biocides to extend the shelf-life foods include: cyclobutanone, cyclopentanone, 2-methylcyclopentanone, 3-methylcyclopentanone, 2,2-dimethylcyclopentanone, 2,4-dimethylcyclopentanone, 2-chlorocyclopentanone, cyclohexanone, 2-methylcyclohexanone, 2-tert-butylcyclohexanone, 3-methylcyclohexanone, 4-methylcyclohexanone, 4-ethylcyclohexanone, 4-tert-butylcyclohexanone, 2,2-dimethylcyclohexanone, 2,6-dimethylcyclohexanone, menthone, 2,2,6-trimethylcyclohexanone, 3,3,5,5-tetramethylcyclohexanone, 2-chlorocyclohexanone, 2-hydroxycyclohexanone dimer, 2-methoxycyclohexanone, 8-mercaptomenthone, 2-nitrocyclohexanone, cycloheptanone, cyclooctanone, cyclononanone, cyclodecanone, cycloundecanone, cyclododecanone, cyclotridecanone, cyclopentadecanone, thujone, nopinone, 2-hydroxy-3-pinanone, norcamphor, fenchone, camphor, 3-chloro-2-norbornanone, 3-bromocamphor, 3-bromocamphor, 3,9-dibromocamphor, 9,10-dibromocamphor, 3,9,10-tribromocamphor, thiocamphor, bicyclo(3,2,1) octan-2-one, bicyclo(3,3,1)nonan-9-one, 1-decalone, trans-1-decalone, 2-decalone, 8-ketotricyclo(5,2,1.0(2,6)decane, 2-adamantanone, chrysanthemyl alcohol, 1-acetyl-2-methyl-1-cyclopentene, 1-acetyl-1-cyclohexene, 4-acetyl-1-methylcyclohexene, alpha-ionone, beta-ionone, 2-acetyl5-norbornene, 2-methyl-2-cyclopenten-1-one, 3-methyl-2-cyclopenten-1-one, 2-pentyl-2-cyclopenten-1-one, 4,4-dimethyl-2-cyclopenten-1-one, 2,3,4,5-tertamethyl-2-cyclopentanone, cis-jasmone, 3-methyl-1,2-cyclopentanedione, 3-ethyl-2-hydroxy-2-cyclopenten-1-one, 6,7-dihydrocyclopenta-1,3-dioxin-5(4H)-one, 2-cyclohexen-1-one, 3-methyl-2-cyclohexen-1-one, 4,4-dimethyl-2-cyclohexen-1-one, 3,5,-dimethyl-2-cyclohexen-1-one, 2,4,4-trimethyl-2-cyclohexen-1-one, isophorone, pulegone, dihydrocarvone, carvone, carvone, 2,4,4,6-tetrabromo-2,5-cyclohexadienone, 4-methyl-4-trichloromethyl-2,5-cyclohexadien-1-one, 5-(1-hydroxy-1-methylethyl)-2-methyl-2-cyclohexen-1-one, 3-ethoxy-2-cyclohexen-1-one, 3-ethoxy-2-methyl-2-cyclohexen-1-one, 4,4-dimethoxy-2,5-cycloheadien-1-one, 3-amino-5,5-dimethyl-2-cyclohexen-1-one, 3-(dimethylamino)-5,5-dimethyl-2-cyclohexen-1-one, 3-(2-hydroxyethylamino)-5,5-dimethyl-2-cyclohexen-1-one, 2-cyclohepten-1-one, tropolone, 8-cyclohexadecen-1-one, verbenone, 3-methylene-2-norbornanone, 4,4A,5,6,7,8-hexahydro-4A-methyl-2 (3H)-naphthalenone, bicyclo(10,3,0)pentadec-12(1)-en-13-one, 1-methoxymethyl-5-norbornen-2-one, 7-syn-methoxymethyl-5-norbornen-2-one, 2-acetylcyclopentanone, 2-acetylcyclohexanone, tetramethyl-1,3-cyclobutanedione, 3,3,5,5-tetramethyl-1,2-cyclopentanedione, 1,3-cyclopentanedione, 2-methyl-1,3-cyclopentaedione, 2-ethyl-1,3-cyclopentanedione, 1,3-cyclohexanedione, 1,4-cyclohexanedione, 1,3-cyclohexanedione, 2-methyl-1,3-cyclohexanedione, 5-methyl-1,3-cyclohexanedione, 5-isopropyl-1,3-cyclohexanedione hydrate, 4,4-dimethyl-1,3-cyclohexanedione, 5,5-dimethyl-1,3-cyclohexanedione, 2-chloro-5,5-dimethyl-1,3-cyclohexanedione, camphorquinone, camphorquinone, 3-(trifluoroacetyl)camphor, 3-(trifluoroacetyl)camphor, 3-heptafluorobutyryl-camphor, 3-heptafluorobutyryl-camphor, cis-bicyclo(3,3,O)octane-3,7-dione, cis-1,5-dimethylbicyclo(3,3,0)octane-3,7-dione, (3AS, 7AS)-hexahydro-3A-hydroxy-7A-methyl-1,5-indandione, bicyclo(3,3,1)nonane-3,7-dione, trans-1,5-decalindione, pentacyclo(5,4,0,0(2,6),0(3,10),0(5,9))-undecane-8,11-dione, 3,4-dihydroxy-3-cyclobutene, 1,2-dione, 3,4-dihydroxy-3-cyclobutene-1,2-dione, dilithium salt, 3,4-dimethoxy-3-cyclobutene, 1,2-dione, 3,4-diisopropoxy-3-cyclobutene-1,2-dione, 3,4-dibutoxy-3-cyclobutene-1,2-dione, 4-cyclopentene-1,3-dione, 4-hydroxy-5-methyl-4-cyclopentene-1,3-dione monohydrate, 2-allyl-2-methyl-1,3-cyclopentanedione, 2,6,6-trimethyl-2-cyclohexene-1,4-dione, 3,5-di-tert-butyl-1,2-benzoquinone, tetrachloro-1,2-benzoquinone, tetrabromo-1,2-benzoquinone, 1,4-benzoquinone, methyl-1,4-benzoquinoline, 2,6-dimethylbenzoquinone, thymoquinone, 2,6-di-tert-butyl-1, 4-benzoquinone, duroquinone, 2-chloro-1,4-benzoquinone, 2,5-dibromo-6-isopropyl-3-methyl-1,4-benzoquinone, tetrafluoro-1,4-benzoquinone, tetrachloro-1,4-benzoquinone, tetrabromo-1,4-benzoquinone, 2,5-dihydroxy-1,4-benzoquinone, chloranilic acid, 2,6-dichloroquinone-4-chloroimide, tetrahydroxy-1,4-quinone hydrate, 2-hydroxymethyl-6-methoxy-1,4-benzoquinone, 2,3-dimethoxy-5-methyl-1,4-benzoquinone, coerulignone, 9-methyl-delta/5(10)-octalin-1,6-dione, 1,4,4A,8A-tetrahydro-endo-1,4-methano-naphthalene-5,8-dione, 2-acetyl-1,3-cyclohexanedione, rhodizonic acid dihydrate, rhodizonic acid disodium salt, hexakeytocyclohexane octahydrate, 2,3-dichloro-1,4,5,8-naphthalenetetrone, 1-diethylamino-3-butanone, 4-acetoxy-2-azetidinone, 1-methyl-4-piperidone, 1-ethyl-3-piperidone hydrochloride, 1-ethyl-4-piperidone, 1-propyl-4-piperidone, 3-quinuclidinone hydrochloride, 2,2,6,6-tetramethyl-4-piperidone monohydrate, 2,2,6,6,-tetramethyl-4-piperidone hydrochloride, 4-((1-methyl-4(1H)-pyridinyl-idene)ethyl-idene)-2,5-cyclohexadien-1-one hydrate, 3-hydroxy-1,2-dimethyl-4(1H)-pyridone, 3,5-diacetyl-1,4-dihydro-2,6-dimethylpyridine, 5,5-dibromobarbituric acid, 4-oxo-temp free radical, 2-methyltetrahydrofuran-3-one, dihydro-2,2,5,5-tetramethyl-3(2H)-furanone, tetrahydro-4H-pyran-4-one, 1,4-cyclohexanedione mono-ethylene ketal, 1,4-cyclohexanedione mono-2,2-dimethyl-trimethylene ketal, 4H-pyran-4-one, 2,6-dimethyl-gamma-pyrone, 3-hydroxy-2-methyl-4-pyrone, tropinone, kojic acid, exo-6-hydroxytropinone, tetrahydrothiophen-3-one, tetrahydrothiopyran-4-one, beta, beta-dimethyl-gamma-(hydroxy-methyl)-gamma-butyrolactone, and 1,6-dioxaspiro(4,4)nonane-2,7-dione.

Non-aromatic nitriles such as isothiocyanates that can potentially be used as biocides to extend the shelf-life of food include: methyl isothiocyanate, ethyl isothiocyanate, propyl isothiocyanate, butyl thiocyanate, tert-butyl thiocyanate, tert-octyl thiocyanate, allyl isothiocyanate, cyclohexyl isothiocyanate, 1-adamantyl isothiocyanate, ethoxycarbonyl isothiocyanate, and 2,3,4,6-tetra-o-acetyl-beta-D-glucopyranosyl isothiocyanate.

Boronic acids (R—B(OH)$_2$) are compounds derived of boric acid B(OH)$_3$ in which one of the three hydroxyl groups of boric acid is replaced by an alkyl or aryl group (Boronic Acids, Dennis G. Hall, ed. (2005), Wiley. ISBN 978-3-527-30991-7). Boronic acids typically have high melting points. Most boronic acids exist as white crystalline solids that can be handled in air without special precautions. At ambient temperature, boronic acids are chemically stable and most display shelf stability for long periods of time. The boronic acid functional group is reputed to have very low inherent toxicity. Most boronic acids present no particular toxicity compared to other organic compounds.

Boronic acids act as Lewis acids. Their unique feature is that they are capable of forming reversible covalent complexes with substances like sugars, amino acids, hydroxamic acids, etc (molecules with vicinal, 1,2 or occasionally, 1,3 substituted Lewis base donors such as alcohols, amines and carboxylates. Boronic acids have ability to bind with compounds having 1,2- and 1,3-diols including saccharides (e.g., sorbitol, fructose, and glucose) and peptidoglycans or with polyols. A prominent feature of boronic acids is their reversible formation of esters with diols in aqueous solution. Boronic acid also act as ligand for forming chelates with metal ions. These properties may be the reasons why boronic acids are good shelf-life extenders.

As used herein the term prevent is defined as stopping or minimizing the action from happening.

Phenylboronic acid, with a pKa value of 8.9 in water, has an acidity comparable to a phenol. It is slightly more acidic than boric acid (pKa 9.2). Boronic acids act as Lewis acids. Their unique feature is that they are capable of forming reversible covalent complexes with substances like sugars, amino acids, hydroxamic acids, etc (molecules with vicinal, 1,2 or occasionally, 1,3 substituted Lewis base donors such as alcohols, amines and carboxylates. They are occasionally used in the area of molecular recognition to bind to saccharides for fluorescent detection or selective transport of saccharides across membranes.

Boronic acids have the ability to bind with compounds having 1,2- and 1,3-diols including saccharides such as sorbitol, fructose, and glucose, and peptidoglycans or with polyols. Boronic acids are used extensively in organic chemistry as chemical building blocks and intermediates predominantly in the Suzuki coupling. The Petasis reaction, is a powerful multicomponent coupling reaction of a boronic acid, an amine, and a carbonyl derivative (Reactivity and Synthetic Applications of Multicomponent Petasis Reactions, Peng Wu et al Chemical review, 119, 11245 (2019)). Heteroaryl boronic acids are also used in Chan-Lam coupling, homologations, conjugate additions, electrophilic allyl shifts, Lieberskind-Strogl coupling, Sonogashira coupling, and Stille coupling. A prominent feature of boronic acids is their reversible formation of esters with diols in aqueous solution. Boronate esters are air stable. The Suzuki-Miyaura cross-coupling reaction can be used with boronate esters.

Particularly preferred boronic acids are selected from a group consisting of 4-bromophenylboronic acid, butylboronic acid, phenyl boronic acid, 4-tert-butylphenylboronic acid, 3-chlorophenylboronic acid, 3,5-dimethylphenylboronic acid, 4-(methoxycarbonyl)-phenylboronic acid, 2-methoxyphenylboronic acid and 3-methoxyphenylboronic acid.

A number of organoboron compounds can be used for extending shelf-life of foods. Some particularly suitable boronic acids suitable for extending shelf-life of foods include: methylboronic acid, ethylboronic acid, propylboronic acid, isopropylboronic acid, butylboronic acid, isobutylboronic acid, pentylboronic acid, hexylboronic acid, n-octylboronic acid, cyclopentylboronic acid, 1-cyclopentenylboronic acid, cyclohexylboronic acid, ferroceneboronic acid, 1,1'-ferrocenediboronic acid, 2-phenylethylboronic acid, 2,4,6-trivinylboroxin-pyridine complex, 3-aminophenylboronic acid monohydrate, 3-aminophenylboronic acid hemisulfate, 2-anthraceneboronic acid, 4-acetylphenylboronic acid, 3-acetylphenylboronic acid, 9-anthraceneboronic acid, 4-amylphenylboronic acid, 3-acetamidophenylboronic acid, 3-amino-4-methylphenylboronic acid, 4-acetoxyphenylboronic acid, phenylboronic acid, 4-bromophenylboronic acid, 2-formylphenylboronic acid, 3,5-bis(trifluoromethyl)-phenylboronic acid, 4-benzyloxyphenylboronic acid, 4-tert-butylphenylboronic acid, 4-biphenylboronic acid, 2-biphenylboronic acid, 3-biphenylboronic acid, 4,4'-biphenyldiboronic acid, 4-butylphenylboronic acid, 4'-bromo-4-biphenylboronic acid, 2-bromophenylboronic acid, 3-bromophenylboronic acid, 2,4-bis(trifluoromethyl)-phenylboronic acid, 3-benzyloxyphenylboronic acid, 2-(bromomethyl)-phenylboronic acid, 2-benzyloxy-5-fluorophenylboronic acid, 3-(tert-butyldimethylsilyloxy)-phenylboronic acid, 4-(tert-butyldimethylsilyloxy)-phenylboronic acid, 2-benzyloxy-4-fluorophenylboronic acid, 3-(bromomethyl)-phenylboronic acid, 2,6-bis[(2,2,6,6-tetramethyl-1-piperidinyl)-methyl]-phenylboronic acid, 3-[(tert-butoxycarbonyl)-amino]phenylboronic acid, 4-[(tert-butoxycarbonyl)-amino]phenylboronic acid, 4-bromo-1-naphthaleneboronic acid, 2-benzyloxyphenylboronic acid, 4-benzyloxy-2-fluorophenylboronic acid, 4-benzyloxy-3-fluorophenylboronic acid, 3-butoxyphenylboronic acid, 2-butoxyphenylboronic acid, 4-(benzyloxycarbonyl)-phenylboronic acid, 3-(tert-butoxycarbonyl)-phenylboronic acid, 4-butoxyphenylboronic acid, 4-(tert-butoxycarbonyl)-phenylboronic acid, 4-carboxyphenylboronic acid, 4-chlorophenylboronic acid, 3-chlorophenylboronic acid, 2-chlorophenylboronic acid, 3-chloro-4-fluorophenylboronic acid, 4-cyanophenylboronic acid, 3-carboxyphenylboronic acid, 3-cyanophenylboronic acid, 5-chloro-2-methoxyphenylboronic acid, 3-carboxy-5-nitrophenylboronic acid, 2-chloro-4-methoxyphenylboronic acid, 2-cyanophenylboronic acid, 4-cyano-3-fluorophenylboronic acid, 2-carboxyphenylboronic acid, 4-carboxy-3-chlorophenylboronic acid, 3-chloro-4-methylphenylboronic acid, 4-carbamoylphenylboronic acid, 4-chloro-3-(trifluoromethyl)-phenylboronic acid, 4-chloro-2-methylphenylboronic acid, 2-chloro-5-(trifluoromethyl)-phenylboronic acid, 4-chloro-2-(trifluoromethyl)-phenylboronic acid, 5-chloro-2-fluorophenylboronic acid, 3-chloro-4-ethoxyphenylboronic acid, 5-chloro-2-methylphenylboronic acid, 2-chloro-5-fluorophenylboronic acid, 3-cyano-4-fluorophenylboronic acid, 4-chloro-3-fluorophenylboronic acid, 2-chloro-4-fluorophenylboronic acid, 3-chloro-5-fluorophenylboronic acid, 4-(9h-carbazol-9-yl)-phenylboronic acid, 3-carboxy-4-fluorophenylboronic acid, 3-chloro-2-fluorophenylboronic acid, 3-(9h-carbazol-9-yl)-phenylboronic acid, 3-chloro-4-hydroxyphenylboronic acid, 3-carbamoylphenylboronic acid, 4-chloro-2-fluorophenylboronic acid, 2-chloro-4-methylphenylboronic acid, 3-chloro-4-methoxyphenylboronic acid, 4-chloro-3-methylphenylboronic acid, 2,4-dichlorophenylboronic acid, 3,5-dichlorophenylboronic acid, 2,5-dichlorophenylboronic acid, 3,5-difluorophenylboronic acid, 2,6-difluorophenylboronic acid, 3,4-dimethylphenylboronic acid, 2,6-dichlorophenylboronic acid, 2,4-difluorophenylboronic acid, 3,5-dimethylphenylboronic acid, 2,3-dichlorophenylboronic acid, 2,4,6-tris(3,4-dichlorophenyl)boroxine, 2,5-difluorophenylboronic acid, 3,4-dimethoxyphenylboronic acid, 3,5-dimethoxyphenylboronic acid, 2,4-dimethylphenylboronic acid, 2,3-dimethylphenylboronic acid, 2,5-dimethylphenylboronic acid, 2,4-dimethoxyphenylboronic acid, 2,5-dimethoxyphenylboronic acid, 2,3-difluorophenylboronic acid, 4-(diphenylamino)-phenylboronic acid, 2,6-dimethylphenylboronic acid, 3,4-dichlorophenylboronic acid, 2,3-dimethoxyphenylboronic acid, 2,6-dimethoxyphenylboronic acid, 9,9-dimethylfluoren-2-boronic acid, 3-(dimethylamino)phenylboronic acid hydrochloride, 3-(dimethylcarbamoyl)-phenylboronic acid, 2,4-dibutoxyphenylboronic acid, 4-(dimethylamino)-phenylboronic acid, 9,10-diphenylanthracene-2-boronic acid, 3,5-dibromophenylboronic acid, 4-(diethylcarbamoyl)-phenylboronic acid, 2,6-difluoro-4-methoxyphenylboronic acid, 2,6-difluoro-3-methoxyphenylboronic acid, 2,3-difluoro-4-methoxyphenylboronic acid, 4-ethylphenylboronic acid, 2-ethoxyphenylboronic acid, 3-ethoxyphenylboronic acid, 4-ethoxyphenylboronic acid, 2-ethylphenylboronic acid, 3-(ethoxycarbonyl)-phenylboronic acid, 4-(ethoxycarbonyl)-phenylboronic acid, 2-(ethoxycarbonyl)-phenylboronic acid, 6-ethoxy-2-naphthaleneboronic acid, 4-ethoxy-3-fluorophenylboronic acid, 4-ethoxy-2-methylphenylboronic acid, 3-ethoxy-5-fluorophenylboronic acid, 4-fluorophenylboronic acid, 3-fluorophenylboronic acid, 2-fluorophenylboronic acid, 3-formylphenylboronic acid, 4-formylphenylboronic acid, 4-fluoro-2-methylphenylboronic acid, 2-fluoro-4-methylphenylboronic acid, 4-fluoro-3-methylphenylboronic acid, 3-fluoro-4-methylphenylboronic acid, 5-fluoro-2-methoxyphenylboronic acid, 2-fluoro-4-biphenylboronic acid, 2-fluoro-5-(trifluoromethyl)-phenylboronic acid, 2-fluoro-4-(trifluoromethyl)-phenylboronic acid, 4-fluoro-3-(trifluoromethyl)-phenylboronic acid, 5-formyl-2-methoxyphenylboronic acid, 3-fluoro-4-methoxyphenylboronic acid, 2-fluoro-5-methylphenylboronic acid, 4-fluoro-3-methoxyphenylboronic acid, 2-fluoro-3-methoxyphenylboronic acid, 2-fluoro-6-methoxyphenylboronic acid, 3-fluoro-4'-propyl-4-biphenylboronic acid, 4-fluoro-3-(methoxycarbonyl)-phenylboronic acid, 3-fluoro-5-hydroxyphenylboronic acid, 3-fluoro-2-methylphenylboronic acid, 5-fluoro-2-methylphenylboronic acid, 5-fluoro-2-hydroxyphenylboronic acid, 2-fluoro-3-(trifluoromethyl)phenylboronic acid, 3-fluoro-4-formylphenylboronic acid, 4-fluoro-2-(trifluoromethyl)phenylboronic acid, 4-fluoro-3-formylphenylboronic acid, 2-fluoro-4-(methoxycarbonyl)-phenylboronic acid, 2-hydroxyphenylboronic acid, 3-hydroxyphenylboronic acid, 4-(hydroxymethyl)phenylboronic acid, 4-hydroxyphenylboronic acid, 3-(hydroxymethyl)phenylboronic acid, 2-(hydroxymethyl)phenylboronic acid, 4-hexyloxyphenylboronic acid, 6-hydroxy-2-naphthaleneboronic acid, 4-hexylphenylboronic acid, 4-hydroxy-2-methylphenylboronic acid, 3-(hydroxymethyl)-4-methoxyphenylboronic acid, 4-isopropylphenylboronic acid, 4-isopropoxyphenylboronic acid, 4-iodophenylboronic acid, 3-isopropylphenylboronic acid, 4-(isopropylthio)phenylboronic acid, 4-methylphenylboronic acid, 4-methyl-3-nitrophenylboronic acid, 4-methoxyphenylboronic acid, 2-methoxyphenylboronic acid, 2-methylphenylboronic acid, 3-methylphenylboronic acid, 3-methoxyphenylboronic acid, 4-(methylthio)phenylboronic acid, 2-(methylthio)phenylboronic acid, 3-(methylthio)phenylboronic acid, 2-(methoxycarbonyl)phenylboronic acid, 3-(methoxycarbonyl)phenylboronic acid, 4-(methoxycarbonyl)phenylboronic acid, 4-(methylsulfonyl)phenylboronic acid, 4-methoxy-2,6-dimethylphenylboronic acid, 4-methoxy-2-methylphenylboronic acid, 6-methoxy-2-naphthaleneboronic acid, 2-methoxy-5-methylphenylboronic acid, 3-mercaptophenylboronic acid, 4-mercaptophenylboronic acid, 4-methyl-1-naphthaleneboronic acid, 3-methacrylamidophenylboronic acid, 4-(methoxymethyl)phenylboronic acid, 2-(methylsulfonyl)phenylboronic acid, 4-methoxy-3,5-dimethylphenylboronic acid, 3-nitrophenylboronic acid, 1-naphthaleneboronic acid, 2-naphthaleneboronic acid, 4-(1-naphthyl)phenylboronic acid, 2-nitrophenylboronic acid, 4-nitrophenylboronic acid, 10-(2-naphthyl)anthracene-9-boronic acid, 4-(2-naphthyl)phenylboronic acid, 3-(2-naphthyl)phenylboronic acid, 9-phenanthreneboronic acid, 1,4-phenylenediboronic acid, 1-pyreneboronic acid, pentafluorophenylboronic acid, 4-propoxyphenylboronic acid, 4-phenoxyphenylboronic acid, 10-phenyl-9-anthraceneboronic acid, 2-(pivalamido)phenylboronic acid, 4-[(1-pyrrolidinyl)carbonyl]-phenylboronic acid, 4-(1-phenyl-1h-benzimidazol-2-yl)phenylboronic acid, 4-(trans-4-propylcyclohexyl)-phenylboronic acid, 4-phenylnaphthalene-1-boronic acid, 4-(1-pyrenyl)phenylboronic acid, 4-(trans-4-pentylcyclohexyl)-phenylboronic acid, 4'-pentyloxybiphenyl-4-boronic acid, 4-(3-pyridyl)phenylboronic acid hydrochloride, 9,9'-spirobi[9h-fluorene]-2-boronic acid, 4-(trifluoromethoxy)phenylboronic acid, 4-(trifluoromethyl)phenylboronic acid, 3-(trifluoromethyl)phenylboronic acid, 2-(trifluoromethyl)phenylboronic acid, 2,4,6-tris(4-fluorophenyl)boroxine, 2,4,6-tris(m-terphenyl-5'-yl)boroxine, 2,4,6-tris(3,4,5-trifluorophenyl)-boroxin, 2,4,6-trimethylphenylboronic acid, 3-(trifluoromethoxy)phenylboronic acid, 2-p-terphenylboronic acid, 2-(trifluoromethoxy)phenylboronic acid, 2,4,6-tris(3,4-difluorophenyl)-boroxin, 2,3,4-trifluorophenylboronic acid, 2,4,6-triphenylboroxin, 2,4,6-triisopropylphenylboronic acid, 3-(trimethylsilyl)phenylboronic acid, 4-(trimethylsilyl)phenylboronic acid, 5'-m-terphenylboronic acid, 2,4,6-trifluorophenylboronic acid, 3,4,5-trimethoxyphenylboronic acid, 2,3,5-trifluorophenylboronic acid, 2-[(2,2,6,6-tetramethyl-1-piperidyl)methyl]phenylboronic acid, 10-(1,1':3',1''-terphenyl-5'-yl) anthracene-9-boronic acid, 4-vinylphenylboronic acid, 2-vinylphenylboronic acid, 5-acetyl-2-thiopheneboronic acid, 5-bromo-2-thiopheneboronic acid, benzo[b]thiophene-2-boronic acid, benzofuran-2-boronic acid, 2-bromopyridine-5-boronic acid, 1-(tert-butoxycarbonyl)-2-pyrroleboronic acid, 1,4-benzodioxane-6-boronic acid, benzofuran-3-boronic acid, benzo[b]thiophene-3-boronic acid, 5-chloro-2-thiopheneboronic acid, 2-chloropyridine-5-boronic acid, 2-chloropyridine-3-boronic acid, 2-chloropyridine-4-boronic acid, 5-chloro-2-fluoropyridine-3-boronic acid, dithieno[3,2-b:2',3'-d]-thiophene-2-boronic acid, 2,6-difluoro-3-pyridineboronic acid, dibenzothiophene-4-boronic acid, dibenzothiophene-2-boronic acid, dibenzofuran-4-boronic acid, 2,6-dimethoxypyridine-3-boronic acid, 2,6-dichloropyridine-3-boronic acid, 2,3-dihydrobenzofuran-5-boronic acid, 2-ethoxypyridine-5-boronic acid, 9-ethylcarbazole-3-boronic acid, 2-furylboronic acid, 3-furylboronic acid, 5'-formyl-2,2'-bithiophene-5-boronic acid, 5-formyl-2-thiopheneboronic acid, 5-formyl-2-furanboronic acid, 2-fluoropyridine-3-boronic acid, 2-fluoropyridine-5-boronic acid, 5-fluoropyridine-3-boronic acid, 2-fluoropyridine-4-boronic acid, 2-fluoro-3-methylpyridine-5-boronic acid, 6-indoleboronic acid, 5-methyl-2-thiopheneboronic acid, 2-methoxypyridine-5-boronic acid, 3,4-(methylenedioxy)phenylboronic acid, 2-methoxypyridine-3-boronic acid, 2-methylpyridine-5-boronic acid hydrochloride, 2-methoxy-5-pyrimidylboronic acid, 2-methoxypyridine-4-boronic acid, 5-methyl-2-furanboronic acid, 5-methoxypyridine-3-boronic acid, 4-pyridylboronic acid, 3-pyridylboronic acid, 5-pyrimidylboronic acid, 9-phenylcarbazole-3-boronic acid, 9-phenylcarbazole-2-boronic acid, quinoline-3-boronic acid, quinoline-8-boronic acid, quinoline-5-boronic acid, 2-thiopheneboronic acid, 3-thiopheneboronic acid, thieno[3,2-b]thiophene-2-boronic acid, and 2-(trifluoromethyl)pyridine-5-boronic acid.

Isothiocyanates (R—N═C═S) are derivatives from glucosinolates in cells of plants of the Cruciferae or mustard family (cabbage, kohlrabi, Brussel sprouts, cauliflower, broccoli, kale, horseradish, mustard, turnips, rutubaga). Isothiocyanates are inhibitory to fungi, yeasts and bacteria in the range of 16-110 ng/ml in the vapor phase and 10-600 µg/ml in liquid media. Inhibition against bacteria varies but generally gram-positive bacteria are less sensitive to ally isothiocyanate than gram-negative bacteria.

Particularly preferred isothiocyanates that can be used as shelf-life extenders include: Allyl isothiocyanate, methyl isothiocyanate, benzyl isothiocyanate, isopropyl isothiocyanate, isobutyl isothiocyanate, propyl isothiocyanate, benzoyl isothiocyanate, cyclohexyl isothiocyanate, ethyl isothiocyanate, butyl isothiocyanate, fluorescein isothiocyanate), ethoxycarbonyl isothiocyanate, phenyl isothiocyanate, phenyl isothiocyanate, 3-iodophenyl isothiocyanate, 4-chlorophenyl isothiocyanate, 2-phenylethyl isothiocyanate, 3-bromophenyl isothiocyanate, fluorescein 5-isothiocyanate, 3-pyridyl isothiocyanate, 1-adamantyl isothiocyanate, 1-naphthyl isothiocyanate, 2-methoxyphenyl isothiocyanate, 4-nitrophenyl isothiocyanate, 4-methoxyphenyl isothiocyanate, fluorescein isothiocyanate dextran, 4-bromophenyl isothiocyanate, fluorescein 6-isothiocyanate, 2-chlorophenyl isothiocyanate, 4-cyanophenyl isothiocyanate, 4-fluorophenyl isothiocyanate, 2-fluorophenyl isothiocyanate, 3-fluorophenyl isothiocyanate, 2-chloroethyl isothiocyanate, 3,4-dimethoxyphenyl isothiocyanate, 2,4-difluorophenyl isothiocyanate, 4-(trifluoromethyl)phenyl isothiocyanate, 2-(trifluoromethyl)phenyl isothiocyanate, 3,4-dichlorophenyl isothiocyanate, 3-(trifluoromethyl)phenyl isothiocyanate, 3,5-dimethylphenyl isothiocyanate, 3-(methylthio)propyl isothiocyanate, 4-(trifluoromethoxy) phenyl isothiocyanate, 2,4-dimethylphenyl isothiocyanate, 3,4-difluorophenyl isothiocyanate, 2,4-dimethoxyphenyl isothiocyanate, 2,3-dichlorophenyl isothiocyanate, 2,4-dichlorophenyl isothiocyanate, sec-butyl isothiocyanate, n-octyl isothiocyanate, 4-penten-1-yl isothiocyanate, p-tolyl isothiocyanate, o-tolyl isothiocyanate, 3-buten-1-yl isothiocyanate, 4-dimethylamino-1-naphthyl isothiocyanate, 4-(dimethylamino)azobenzene 4'-isothiocyanate, m-tolyl isothiocyanate, 2,4,6-trimethylphenyl isothiocyanate, 3,5-bis(trifluoromethyl)phenyl isothiocyanate, 4-tert-butylphenyl isothiocyanate, 5-fluoro-o-tolyl isothiocyanate, 2,3,4,6-tetra-o-benzoyl-β-d-glucopyranosyl isothiocyanate, 2,3,4,6-tetra-o-acetyl-β-d-glucopyranosyl isothiocyanate, 4-isothiocyanato-2-(trifluoromethyl)benzonitrile, ethyl isothiocyanatoacetate, dansylamino-pitc, dl-sulforaphane, isothiocyanatocyclopropane, 1-isothiocyanato-3-nitrobenzene, 1,3-diisopropyl-2-isothiocyanatobenzene, and erucin.

Allyl cyanate, allyl isothiocyanate, allyl thiocyanate, benzyl isothiocyanate, butyl isothiocyanate, 1-cyano-2,3-epithiopropane, cyclopentyl isothiocyanate, diallyl sulfide, epithionitrile, isobutyl isothiocyanate, isopropyl isothiocyanate, methyl isothiocyanate, oxazolidine thione, phenylethyl isothiocyanate, phenethyl thiocyanate, phenyl isothiocyanate and phenylpropyl thiocyanate are found in cruciferous produce.

Many products have a natural coating of wax and cannot be easily wetted. Extending the shelf-life of wax coated products requires a spray or dip coating with an aqueous solution of a shelf-life extender. In order get a uniform coating on produce, especially those who have a layer of natural wax, it is desirable to have a wetting agent, or surfactant, added in the solution. A large number of surfactants, many of them FDA approved for foods, are commercially available. Such wetting agents can be added in a solution of shelf-life extender before the spraying. In order to provide a thicker layer of shelf-life extender, one can add a thickening agent such as water-soluble polymers such as starch and guar gum. As an alternative, one can make an emulsion or dispersion of shelf-life extenders and coat the produce. The shelf-life extenders disclosed herein can be added in waxes and coated on produce.

Fungicides kill fungi by damaging their cell membranes, inactivating critical enzymes or proteins, or by interfering with key processes such as energy production or respiration. Narrow-spectrum fungicides are effective against only a few usually closely related pathogens. These usually have single-site activity and are often systemic. Broad-spectrum fungicides can often control a wide range of unrelated pathogens. These usually are contacts with multi-site activity. Shelf-life extenders disclosed herein are fungicides who prevent fungus formation and growth appear to be broad spectrum and they can be used to prevent fungus formation in pre-harvest foods.

Though we used small produce for demonstration of feasibility concepts, it is obvious that the materials and methods disclosed herein to extend the shelf-life can be used for large produce such as watermelon, cantaloupe, honeydew, pineapple, pumpkins and a number of other large produce. Likewise, we demonstrated the concepts using a small number but the materials and methods disclosed herein to extend the shelf-life can also be used for a large number of other foods.

The materials and methods disclosed herein can be used to keep a variety of produce green longer while fresh or as specimen after drying. Christmas trees and other decorative trees, branches and leaves can be kept green longer and fresher.

Chemical and biochemical changes in the food exposed to the shelf-life extenders can be determined by analytical methods, such as H PLC, mass spectroscopy, FTIR, NMR and many others including bio-analytical methods and instruments.

Devices

For control release of shelf-life extenders, they can be microencapsulated or sachets with a proper barrier material can be prepared.

Sachet Size and Barrier Films

A sachet can be a small blister bubble as in bubble packaging. The size of the blister or sachet can be from 10 cubic mm to 100 cubic centimeter or larger if required. The choice of the wall material for sachets will depend upon the nature of the shelf-life extender. The sachet can be made from common plastic films or laminated plastic films such as that of polyethylene, polypropylene, polyvinyls, nylons, polyesters, cellophane, cellulose acetate and that of many copolymers. For highly permeable shelf-life extender such as allyl isothiocyanate a high barrier plastic film such as that of polyester and for less permeable materials such as phenyl isothiocyanate a highly permeable material such as polyethylene is preferred. The rate of release (permeation) of liquid shelf-life extenders can also be controlled by varying the thickness of the film used for making the sachet. The thickness of the film of the sachet can be varied from 10 to 1,000 microns. For solid shelf-life extenders, such as Himalayan/black salt a precursor for hydrogen sulfide, materials such as paper, fabric or synthetic materials such as Tyvek can be used.

Micro-Encapsulation

Shelf-life extenders can be microencapsulated and activated by rupturing microcapsule by heat or pressure.

Fumigation

Some of the shelf-life extenders which prevent growth of fungus and kill bacteria and viruses can be used for fumigation of foods such as grains, legumes and produce.

Pre-Harvest Applications

The shelf-life extenders can also be used for pre-harvest foods. For example, the shelf-life extenders can be sprayed on produce or irrigated before harvesting. Animals can be fed shelf-life extenders before slaughtering or shelf-life extenders can be added in a water tank before killing fish. Less volatile liquids and solids, preferably thiocyanates, isothiocyanates, cyclic ketones and their precursor can be sprayed on crops before harvesting or used as pest and insect control, such as a pesticide, and to keep produce fresh and green longer.

Optimization

The exposure required, e.g., total dose, to extend the shelf-life of a produce will depend upon many variables such as the nature and concentration of the shelf-life extenders. Optimum performance of the shelf-life extenders can be obtained by optimizing the systems.

Two Treatments

If required, produce can be pre-exposed or pre-treated with a shelf-life extender followed by use of a sachet containing the same or another shelf-life extender. The terms pre-exposure and pre-treatment are used interchangeably herein. Pre-exposure includes dipping/rinsing food in a solution of a shelf-life extender. Wax coating and current materials and method can be combined. Produce can be pre-treated with the shelf-life extender followed by coating with a wax or vice versa or the shelf-life extenders can be added in the wax coating.

An edible wax coating formulation was prepared by heating a mixture of 300 g of distilled water, 40 g of candelilla wax (melting point 68-72° C.) and 4 g of polysorbate as an emulsifier to 90° C. and homogenizing with a high speed stirrer for a few minutes. The mixture was then cooled to room temperature in five minutes by circulating cold water and 200 g of distilled cold water was added. To about 50 g of the edible wax suspension were added 0.2 g of (i) ethyl isothiocyanate, (ii) phenyl isothiocyanate, (iii) acetylacetonate, and (iv) phenyl boronic acid and mixed. A black fungus grew on the control sample (a sample without any shelf-life extender) after ten days, while there was no fungus on samples containing the shelf-life extenders at 35 days. Examples of waxes that can be coated on produce with the shelf-life extender include natural and synthetic polymers such as polyethylene, polyester and polyamides, and natural polymers and waxes such as agar, beeswax, candelilla wax, carnauba wax, guar, gum arabic, acacia gum, karaya, microcrystalline synthetic wax, shellac, tragacanth, xanthan and zein. Addition of the shelf-life extenders in the edible polymeric coating will enhance the effectiveness of the coating as the shelf-life extenders will further extend the shelf life by preventing or minimizing growth of fungus, keep produce green/colored longer and delay ripening.

The effectiveness of the shelf-life extenders has been demonstrated by the growth of fungus being reduced or stopped, green produce kept green longer, the ripening of some fruits delayed, freshness and crispiness of produce extended, liquid foods such as milk and juices preserved longer; seeds such as grains, legumes, nuts and root vegetables such potatoes; prevented from sprouting or germinating, sweating/perspiration and hence wilting reduced, and prepared/processed foods kept fresher longer.

A brief description of produce wherein the invention has been demonstrated, including their genus/biological names are provided herein. Apple is an edible fruit produced by an apple tree (*Malus domestica*) and with the most widely grown species in the genus Malus. Banana is an elongated, edible fruit which is botanically a berry in the genus Musa wherein the fruit is variable in size, color, and firmness. Almost all modern edible seedless (parthenocarp) bananas come from two wild species—*Musa acuminata* and *Musa balbisiana*. Basil (*Ocimum basilicum*) is a culinary herb of the family Lamiaceae (mints). Blackberry is an edible fruit produced by many species in the genus *Rubus* in the family Rosaceae, hybrids among these species within the subgenus *Rubus*, and hybrids between the subgenera *Rubus* and *Idaeobatus*. Blueberries are perennial flowering plants with blue or purple berries classified in the section *Cyanococcus* within the genus *Vaccinium*. Broccoli is an edible green plant in the cabbage family (family Brassicaceae, genus *Brassica*) whose large flowering head, stalk and small associated leaves are eaten as a vegetable.

Carrot (*Daucus carota* subsp. *sativus*) is a root vegetable, usually orange in color. Carrot is a domesticated form of the wild carrot, *Daucus carota*, native to Europe and Southwestern Asia. Cherry tomato is a type of small round tomato believed to be an intermediate genetic admixture between wild currant-type tomatoes and domesticated garden tomatoes. The cherry tomato is regarded as a botanical variety of the cultivated berry, *Solanum lycopersicum* var. *cerasiforme*. Chickpea, or chick pea, (*Cicer arietinum*) is an annual legume of the family Fabaceae, subfamily Faboideae. Different types of chickpeas are variously known as gram, garbanzo or Egyptian pea. Choli beans, Cow pea (*Vigna unguiculata*) is a legume from the genus *Vigna*. Cilantro is an herb from the fresh leaves of the coriander plant (*Coriandrum sativum*). Cilantro is a member of the parsley family and the herb is also known as Chinese parsley and Mexican parsley. Clementines (*Citrus* x *clementina*) is a tangor which a citrus fruit hybrid between a willowleaf mandarin orange (*C.* x *deliciosa*) and a sweet orange (*C.* x *sinensis*). Tangerines, which are similar to clementines tend to be easy to peel. Coriander (*Coriandrum sativum*) is an annual herb in the family Apiaceae and also known as Chinese parsley, dhania or cilantro. Cucumber (*Cucumis sativus*) is a widely-cultivated creeping vine plant in the Cucurbitaceae gourd family that bears cucumiform fruits, which are used as vegetables. In North America, the term wild cucumber refers to plants in the genera *Echinocystis* and *Marah*, though the two are not closely related.

Dill (*Anethum graveolens*) is an annual herb in the celery family Apiaceae and is the only species in the genus *Anethum*. Dill is grown widely in Eurasia where its leaves and seeds are used as an herb or spice for flavoring food. Eggplant, anglophone, aubergine or brinjal is a plant species in the nightshade family Solanaceae. *Solanum melongena* is grown worldwide for its edible fruit. Fenugreek, (*Trigonella foenum-graecum*) is an annual plant in the family Fabaceae, with leaves consisting of three small obovate to oblong leaflets. Grape is a fruit, botanically a berry, of the deciduous woody vines of the flowering plant genus *Vitis*. Guar or cluster bean, with the botanical name *Cyamopsis tetragonoloba*, is an annual legume and the source of guar gum also known as gavar or guvar bean. Lemon, *Citrus limon*, is a species of small evergreen tree in the flowering plant family Rutaceae, native to South Asia, primarily North eastern India. Lima beans (*Phaseolus lunatus*) commonly known as the lima bean, butter bean, sieva bean, double bean or Madagascar bean, is a legume grown for its edible seeds or beans. Lime is a citrus fruit, which is typically round, green in color, contains acidic juice vesicles. Lychee or Litchee is the sole member of the genus Litchi in the soapberry family, Sapindaceae.

Math or moth bean (*Vigna aconitifolia*) is a legume, commonly grown in regions of India. Mint (Lamiaceae or labiatae) are a family of flowering plants commonly known as the mint or deadnettle or sage family. Many of the plants are aromatic in all parts and include widely used culinary herbs like basil, mentha, rosemary, sage, savory, marjoram, oregano, hyssop, thyme, lavender, and perilla. Mushroom or edible mushrooms are the fleshy and edible fruit bodies of several species of macrofungi. The standard for the name "mushroom" is the cultivated white button mushroom, *Agaricus bisporus*; hence the word "mushroom" is most often applied to those fungi (Basidiomycota, Agaricomycetes) that have a stem (stipe), a cap (pileus), and gills (*lamellae*, sing. *lamella*) on the underside of the cap. Mung or mung bean (*Vigna radiata*), is a legume mainly cultivated in East Asia. Orange is the fruit of various citrus species in the family Rutaceae primarily refers to *Citrus* x *sinensis*, which is also called sweet orange, to distinguish it from the related *Citrus* x *aurantium*, referred to as bitter orange.

Papadi beans or flat beans, also known as helda beans, romano beans and "sem fhali" in some Indian states, are a variety of *Phaseolus coccineus*, known as runner beans with edible pods that have a characteristic wide and flat shape. Parsley or garden parsley (*Petroselinum crispum*) is a species of flowering plant in the family Apiaceae that is native to the central and eastern Mediterranean region which is widely cultivated as an herb and a vegetable. Parval (*Tricho-* santhes dioica), also known as pointed gourd, is a vine plant in the family Cucurbitaceae, similar to cucumber and squash. Parval is a dioecious (male and female plants) vine (creeper) plant with heart-shaped leaves (cordate) and is typically grown on a trellis. Peanut, also known as the groundnut and taxonomically classified as *Arachis hypogaea*, is a legume crop grown mainly for its edible seeds. It is classified as both a grain legume and, due to its high oil content, an oil crop; Pearl onion (*Allium ampeloprasum* var. sectivum or *A. ampeloprasum* 'Pearl-Onion Group'), also known as button, baby or silverskin onions is a close relative of the leek (*A. ampeloprasum* var. *porrum*). Pepper or chili pepper (also chile, chilli) is the fruit of plants from the genus *Capsicum* which are members of the nightshade family, Solanaceae. Plum is a fruit of the subgenus *Prunus*. Potato is a root vegetable native to the Americas and is a starchy tuber of the plant *Solanum tuberosum* wherein the plant itself is a perennial in the nightshade family, Solanaceae;

Radish (*Raphanus raphanistrum sativus*) is an edible root vegetable of the family Brassicaceae. Raspberry is an edible fruit of a multitude of plant species in the genus *Rubus* of the rose family most of which are in the subgenus Idaeobatus wherein the name also applies to these plants themselves. Snow Peas is an edible-pod pea with flat pods and thin pod walls, which is typically eaten whole, with both the seeds and the pod, while still unripe. Strawberry, garden strawberry (or simply strawberry; *Fragaria* x *ananassa*) is a widely grown hybrid species of the genus *Fragaria*, collectively known as the strawberries, which are cultivated worldwide for their fruit. String Beans. Green beans are the unripe, young fruit of various cultivars of the common bean (*Phaseolus vulgaris*) wherein immature or young pods of the runner bean (*Phaseolus coccineus*), yard long bean (*Vigna unguiculata* subsp. *sesquipedalis*), and hyacinth bean (*Lablab purpureus*) are used in a similar way. Tindora (*Coccinia grandis*, the ivy gourd), also known as scarlet gourd, tindora and kowai fruit is a tropical vine which grows primarily in tropical climates and is commonly found in the southern Indian states where it forms a part of the local cuisine. Rajama is a red kidney bean. Tuver, or pigeon pea, (*Cajanus cajan*) is a legume grown in Asia. Urad bean, black gram (*Vigna mungo*) is a bean gown in South Asia. Vaal or lima beans (*Phaseolus lunatus*) is legume grown for its edible seed. Vatana or peas is (*Pisum sativum*) is a legume and has many varieties.

The shelf-extenders can be used for extending shelf-life of meat such as chicken, mutton, pork, beef, camel, horse, emu, alligator, crocodile, turtle, ostrich, duck, deer, zebra, water buffalo, and rabbit.

The shelf-extenders can be used for extending shelf-life of fish such as basa, flounder, hake, scup, smelt, rainbow trout, hardshell clam, blue crab, peekytoe crab, spanner crab, cuttlefish, eastern oyster, Pacific oyster, anchovy, herring, lingcod, moi, orange roughy, Atlantic Ocean perch, Lake Victoria perch, yellow perch, European oyster, sea urchin, Atlantic mackerel, Sardines, Black sea bass, European sea bass, hybrid striped bass, bream, cod, drum, haddock, hoki, Alaska pollock, rockfish, pink salmon, snapper, tilapia, turbot, walleye, lake whitefish, wolffish, hardshell clam, surf clam, cockle, Jonah crab, snow crab, crayfish, bay scallop, Chinese white shrimp, sablefish, Atlantic salmon, coho salmon, skate, dungeness crab, king crab, blue mussel, greenshell mussel, pink shrimp, escolar, chinook salmon, chum salmon, American shad, Arctic char, carp, catfish, dory, grouper, halibut, monkfish, pompano, Dover sole, sturgeon, tilefish, wahoo, yellowtail, abalone, conch, stone crab, American lobster, spiny lobster, octopus, black tiger shrimp, freshwater shrimp, gulf shrimp, Pacific white shrimp, squid, barramundi, cusk, dogfish, kingklip, mahimahi, opah, mako shark, swordfish, albacore tuna, yellowfin tuna, geoduck clam, squat lobster, sea scallop, rock shrimp, barracuda, Chilean sea bass, cobia, croaker, eel, blue marlin, mullet, sockeye salmon and bluefin tuna.

Throughout the specification the term treated refers to food that was previously treated or is currently being treated.

Although the invention has been described with regard to its preferred embodiments, it should be understood that changes, optimization and modifications obvious to one having the ordinary skill in his art may be made without departing from the scope of the invention. The following examples are illustrative of carrying out the claimed invention but should not be construed as being limitation on the scope or spirit of the instant invention.

EXAMPLES

Example 1: Containers Used for Testing

Food exposed to preservatives or by a sachet was placed in typically polystyrene or acrylic containers depending upon the size and number of food items. Glass jars and bottles were also used. The containers were snap-closed or with a lid. The containers were purchased mainly from Amazon or Webstaurant.com store. When needed, plastic containers with holes or without lids were used.

Example 2: Preservatives

The following shelf-life extenders were more widely used than the others: Allyl isothiocyanate: CAS number 57-06-7, Cyclohexanone: CAS number 108-94-1, 2-Cyclohexen-1-one: CAS number 930-68-7, 1-Methyl-1-cyclopentene: CAS number 693-89-0, Acetylacetone (Pentane-2,4-dione): CAS number: 123-54-6, 3-chlorophenylboronic acid: CAS 63503-60-6, Phenylboronic acid: CAS #98-80-6, and Butylboronic acid: CAS #4426-47-5. These chemicals were mainly purchased from TCI America, Portland, OR and Sigma Aldrich, St. Louis, MO.

Example 3: Sachets

For controlled exposure and a constant supply of a preservative to foods, sachets containing one or more drops of preservatives were used. Sachets were made by placing an appropriate amount of a preservative in a plastic bag containing a piece of paper and heat sealing the bag. The sachet bag materials used were Tyvek® for solid preservative, polyethylene, polyester and high barrier multilayer films were used for liquid preservatives. These bags were sealed with a heat sealer. The sachet was typically applied on one side of the container containing food.

Example 4: Pre-Exposure to Vapor of Preservatives

A piece of paper napkin was taped inside a 100 microns thick polyethylene or polyester Ziploc bag. The size of the bag varied from ~20 cm×30 cm to ~60 cm×90 cm depended on the sample with sandwich bags up to gallon bags being exemplary. The paper napkin was wetted with 0.1-0.5 ml of a preservative or a mixture of preservatives. A tray of aluminum, stainless steel or glass containing the foods was placed inside the plastic (polyethylene, polyester and multilayer-laminated) bag and almost closed by locking the Ziploc. Air was blown with an air blower from the unclosed end until the bag was fully blown and then quickly closed tightly by locking the remaining Ziploc. If a preservative was a sublimable solid, it was placed in a petri dish and then placed inside the bag in the tray before blowing air. The exposure time was varied from five minutes to a day depending upon the food. For example, the time was typically minutes for leafy vegetables, hours for produce having a thick skin and 10-20 hours those having a natural wax coating on the skin and large produce. The assembly was shaken periodically. After the predetermined time, the tray containing produce was removed from the bag, allowed to de-gas for 10-30 minutes in air and the produce was then placed in an appropriately sized container. Glass and stainless steel containers with lids were also often used.

Example 5: Soaking Foods in Solution of Preservatives

A solution of one or more preservatives was prepared in a large (e.g., 2-10 liter) glass beaker or a jar. A sack containing the food was prepared by placing the food in a plastic mesh bag. The sack was placed in the solution of the preservative. A smaller glass beaker containing proper amount of water was place over the package to keep the sack soaked in the solution of the preservative during the treatment. The solution was stirred either with a plastic spatula or with a magnet over a magnetic stirrer. After treatment, the mesh sack was removed, the produce was washed in a tray with running water, strained and air dried at 30° C. in an air blowing oven for about 5-10 minutes, while shaking the tray or turning the food periodically followed by placing the sample in an appropriate container.

Example 6: Spray Coating

The food was placed in mesh trays and sprayed with an aqueous solution (1-10%) of a preservative while shaking the tray or turning the food. The solution was allowed to drain from the tray and the food was air dried in an air blowing oven at 30° C. for about 5-10 minutes, while shaking the tray or turning food periodically followed by placing the sample in an appropriate container.

If required, for produce such as pepper and eggplant having natural wax, an edible wetting agent/surfactant (usually less than 0.5%), such as polysorbate was added in the solution of the preservative before spraying.

Example 7: Addition of Preservative in Foods

If the food was liquid, such as milk or freshly prepared juices, the preservative was added in the food while stirring.

Example 8: Testing and Recording the Results

The untreated (control sample) and treated food were placed in proper sized plastic containers and the containers were tightly closed. The containers containing the treated and untreated food were stored, usually in dark, at room temperature (about Photographs were taken after closing the container and then periodically as needed. Typically, a food container was discarded if it developed fungus or if the food emitted an undesired odor. The treated food was neither eaten nor analyzed by any analytical instrument or a method. Sometimes, the firmness of produce was tested by breaking or cutting it.

Example 9: Criteria Used for Testing of Food

The following major criteria were used for determining spoilage of foods: growth of fungus, color change, unpleasant odor, wilting, firmness or shriveling, change of state (liquid to solid or vice versa), and sprouting or germination Example 10: Sources of food.

Almost all produce, fruits and vegetables, and other foods were purchased from the local vendors.

Examples 11-174

The results are tabulated in Tables 1-6.

FIG. 1 demonstrates the retardation of the growth of fungus on blueberries with 2-methylcyclohexanone using the sachet method corresponding to Example 117. The untreated control sample on the $5^{th}$ day (a), and that treated with 2-methylcyclohexanone by the sachet method on the $67^{th}$ day (b), at room temperature. The fungus started appearing on the $2^{nd}$ day in the untreated control sample while there was no fungus in the treated sample even on the $67^{th}$ day.

Figure 2:
FIG. 2 is a photograph indicating retardation on growth of fungus on cheese.
Figure 2:
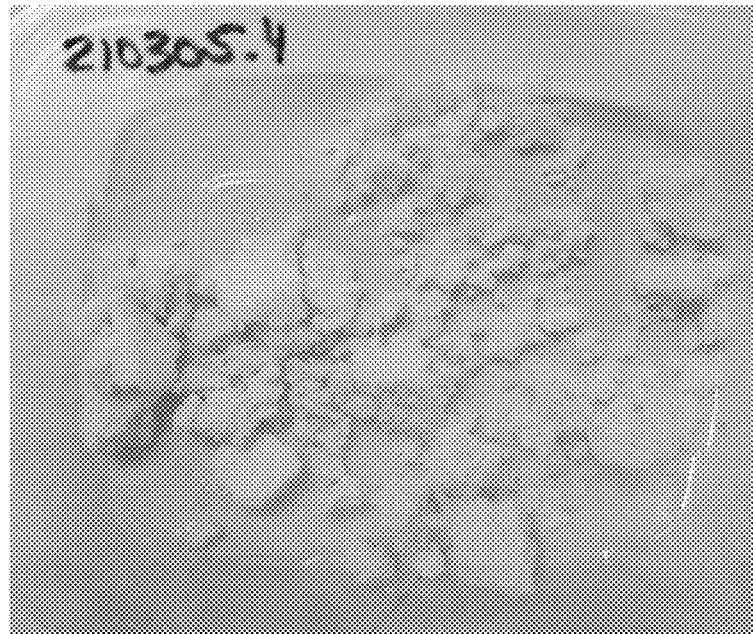

FIG. 2 demonstrates the retardation of the growth of fungus on homemade farmer's cheese by pre-treating with allyl isothiocyanate vapor corresponding to Example 32. The untreated control sample on the $10^{th}$ day (a), and that treated allyl isothiocyanate vapor on the $35^{th}$ day (b), at room temperature. The fungus started on day 5 in the untreated control sample while there was no fungus in the treated sample even on the $35^{th}$ day.

Figure 3:
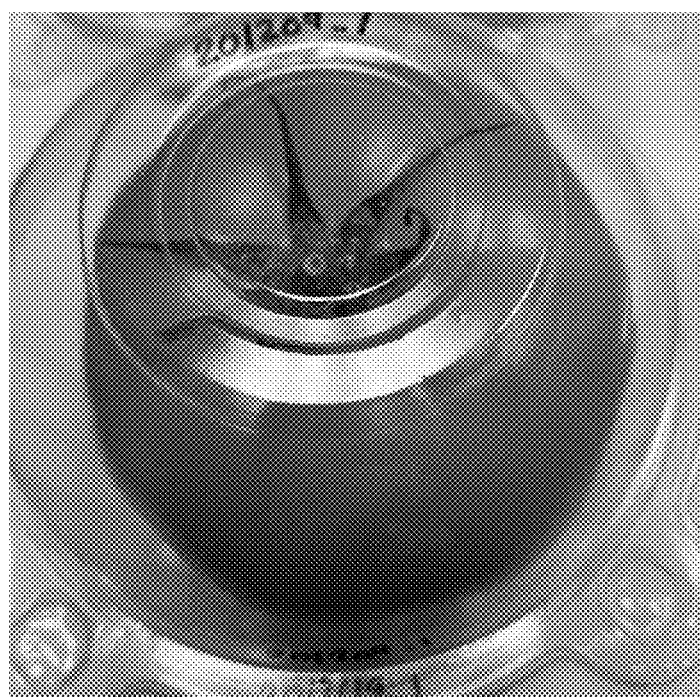
FIG. 3 is a photograph indicating delayed ripening of green tomatoes.
Figure 3:
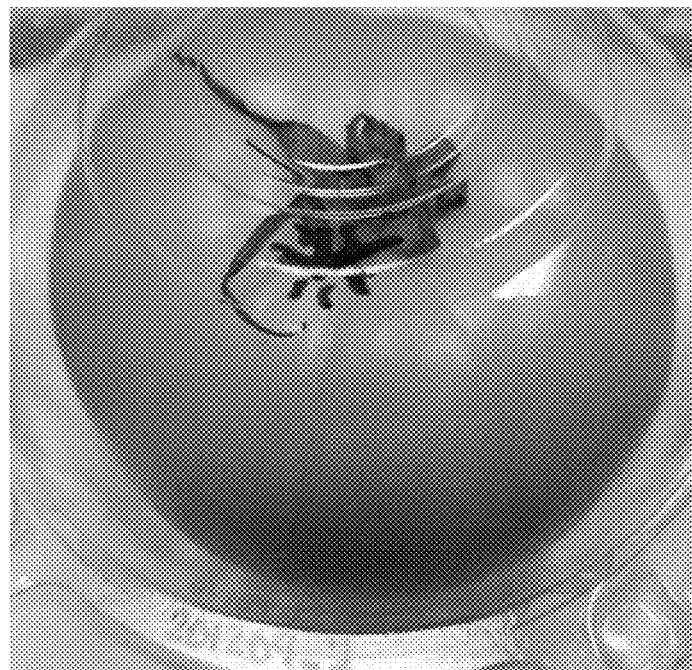

FIG. 3 demonstrates the delayed ripening in green tomatoes with cyclohexanone corresponding to Example 106. The untreated control sample on the $10^{th}$ day (a), and that treated with a cyclohexanone sachet on the $13^{th}$ days (b), at room temperature. The untreated control sample started changing from green to red on about the $7^{th}$ day and was red on the $10^{th}$ day while that treated with a cyclohexanone sachet was yellow on the $14^{th}$ day and turned red on the $18^{th}$ day.

Figure 4:
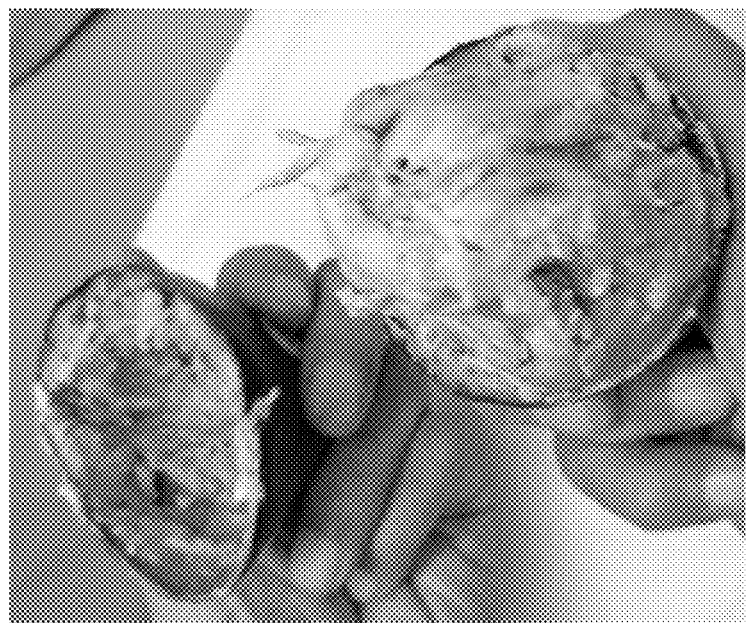
FIG. 4 is a photograph indicating delayed ripening of avocado.
Figure 4:

FIG. 4 demonstrates the delayed ripening of avocado with pre-exposure to acetylacetone vapor corresponding to Example 127. The cut control sample on the $7^{th}$ day (a), and that pre-exposed to vapor of acetylacetone on the $9^{th}$ day (b), at room temperature. The untreated control sample ripened and was soft and mushy at 7 days while that pre-exposed to vapor of acetylacetone was fresh, firm and green even on the $9^{th}$ day.

Figure 5:
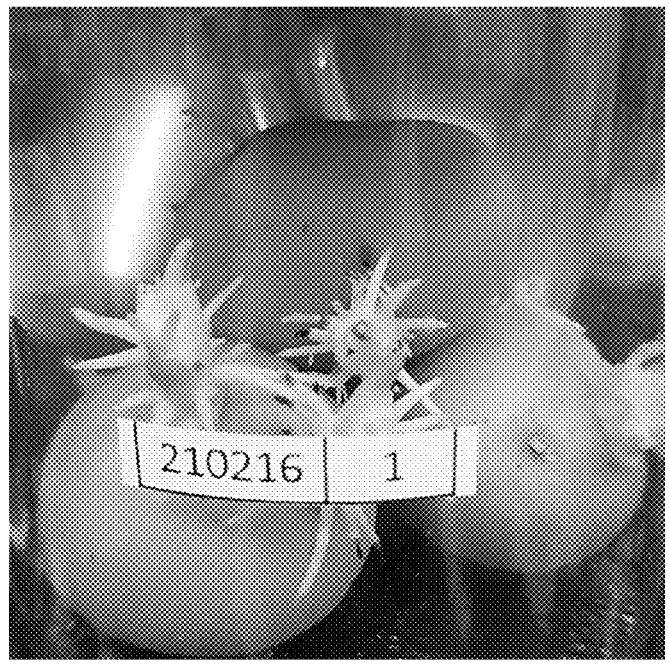
FIG. 5 is a photograph indicating delayed sprouting of potatoes.
Figure 5:
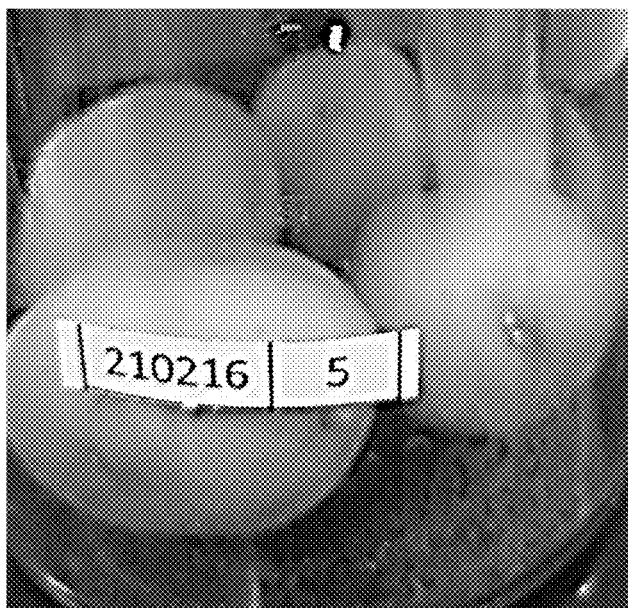

FIG. 5 demonstrates the delayed sprouting of potatoes with acetylacetone by sachet method under 100% relative humidity corresponding to Example 129. The untreated control samples of small yellow potatoes on the $20^{th}$ day (a), and that treated with acetylacetone sachet method on the $48^{th}$ day (b) at room temperature. The small yellow potatoes started sprouting on about the $6^{th}$ day while there was no sprouting of the potatoes treated with acetylacetonate even on the $48^{th}$ day.

Figure 6:
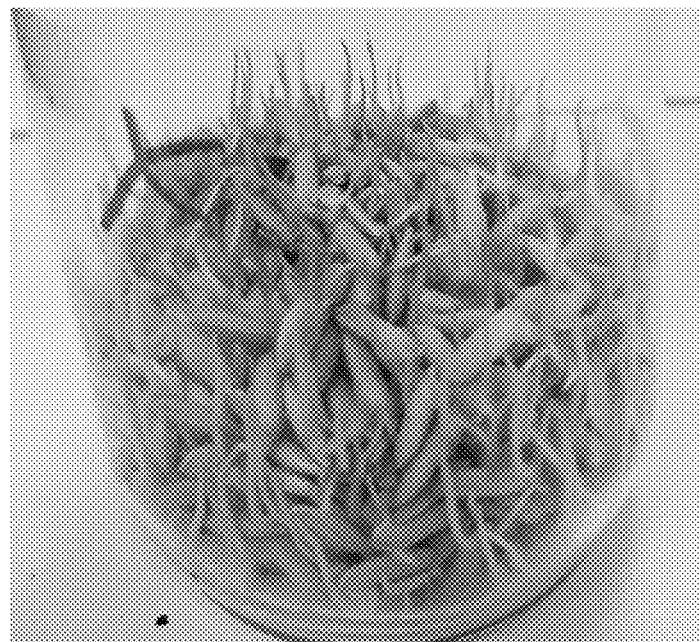
FIG. 6 is a photograph indicating retarded germination of unhusked rice.
Figure 6:
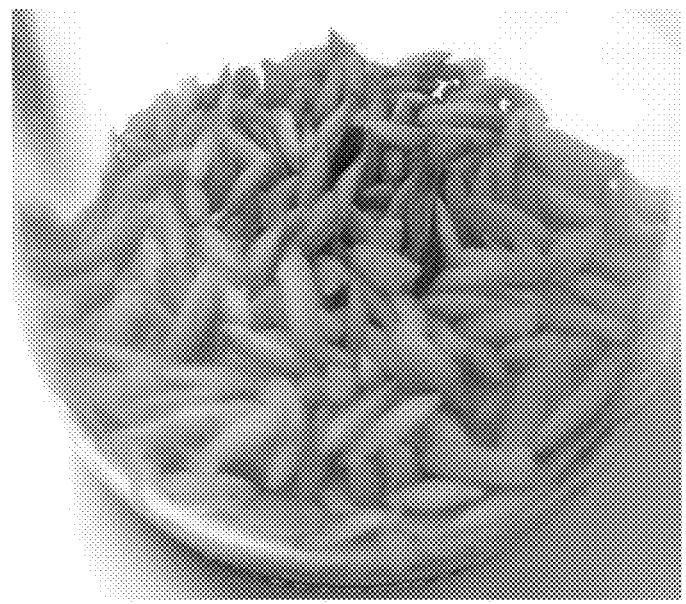

FIG. 6 demonstrates the retardation of germination of unhusked rice pre-soaked in water for 16 hours and then treated with allyl isothiocyanate by sachet method corresponding to Example 71. The untreated control samples of unhusked rice on $8^{th}$ day (a), and that treated with a sachet of ally isothiocyanate after 41 days (b), at room temperature. The untreated control sample started germinating on the 3rd day while there was no germination of the unhusked rice treated with allyl isothiocyanate sachet even on the $41^{st}$ day.

Figure 7:
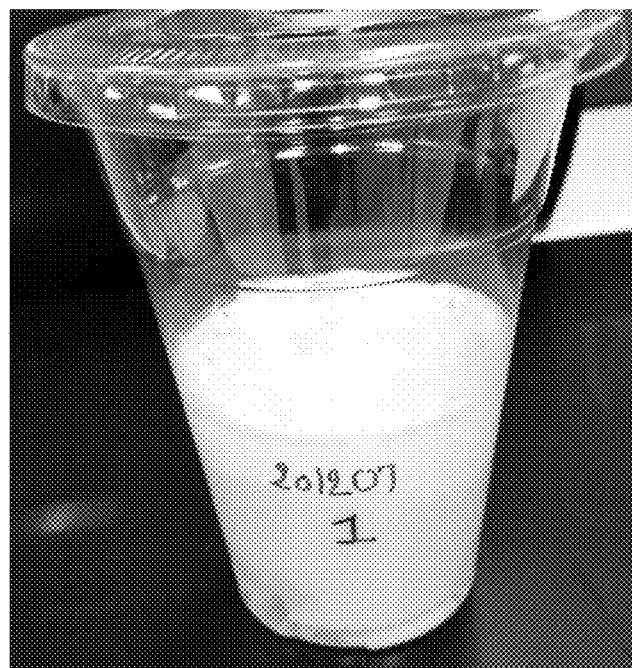
FIG. 7 is a photograph indicating delayed curdling of pasteurized milk.
Figure 7:

FIG. 7 demonstrates the delayed curdling of pasteurized milk with allyl isothiocyanate corresponding to Example 19. In ~200 g of pasteurized milk 2 drops (~0.05 g) of allyl isothiocyanate was added and thoroughly stirred/mixed. The untreated control sample on the $4^{th}$ day (a), and that treated with ally isothiocyanate on the $21^{st}$ day (b), at room temperature. The untreated control sample started curdling on the $2^{nd}$ day and became solid and began to emit an unpleasant odor on the $4^{th}$ day while that treated with allyl isothiocyanate was still fluid and pourable with no solid and no unpleasant odor emitted even on the $21^{st}$ day.

Figure 8:
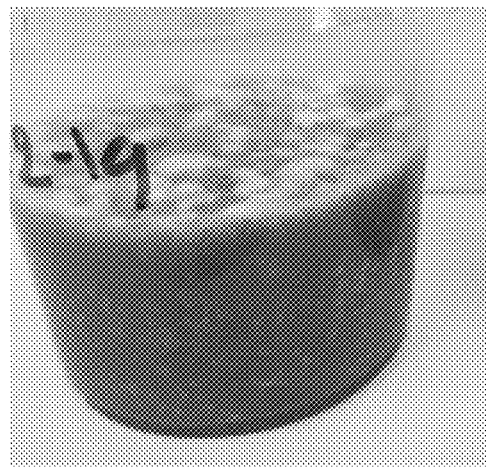
FIG. 8 is a photograph indicating delayed fungus growth on cold pressed fresh red tomato juice.
Figure 8:
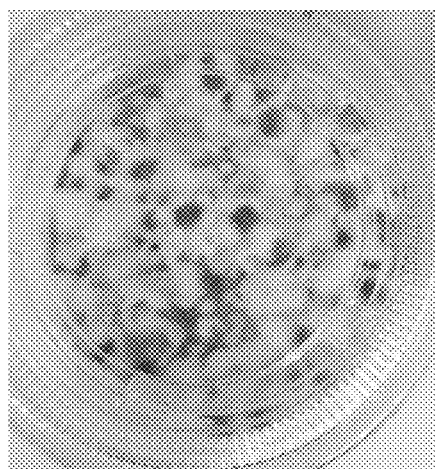
Figure 8:
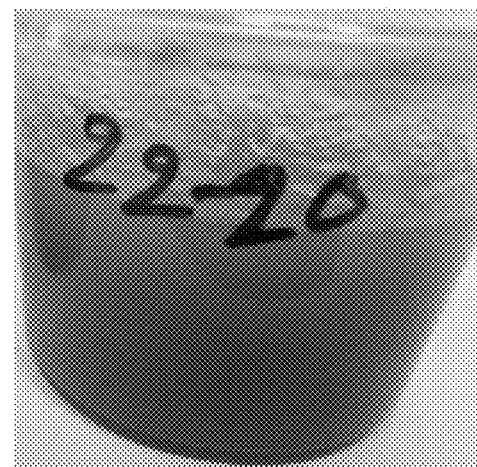
Figure 8:
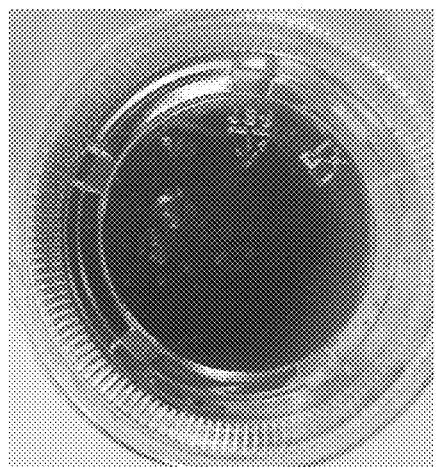

FIG. 8 demonstrates the delayed growth of fungus on cold pressed fresh red tomato juice corresponding to Example 61. In about 100 g of cold pressed fresh red tomato juice was added one drop (~0.02 g) of ally isothiocyanate and thoroughly stirred/mixed. The untreated control sample (a) and its top view (a1) on the $7^{th}$ day, and that treated with ally isothiocyanate (b), its top view (b1) on the $7^{th}$ day, at room temperature. The white and green fungus started appearing on 3rd day on the control sample (a), and (a1) while there was no fungus or bad odor on the sample treated with allyl isothiocyanate on the $20^{th}$ day (b) and (b1).

The effect of isothiocyanate shelf-life extenders is provided in Table 1. In Table 1 the following abbreviations are used: A is Indian cottage cheese; B is fresh, cold pressed red cabbage juice; C is fresh, cold pressed blackberry juice; D is Indian ivy gourd; E is fresh, cold pressed Red Delicious apple juice; F is fresh, cold pressed beet juice; G is fresh, cold pressed blueberry juice; H is fresh, cold pressed carrot juice; I is Homemade Farmer's cheese; J is fresh, cold pressed grape juice; K is fresh, cold pressed honeydew juice; L is Indian pointed gourd; M is Indian bitter melon; N is fresh, cold pressed pomegranate juice; O is Indian fried bread; P is fresh, cold pressed red grape juice; Q is Indian millet bread; R is fresh, cold pressed tomato juice; S is fresh, cold pressed orange juice; T is mixture of kidney beans, moong whole, kala chana, black eye beans, red chori, muth, urad whole/black matpe, val whole, and toor whole; U is Indian fenugreek; AI is allyl isothiocyanate; EI is ethyl isothiocyanate; PI is phenyl isothiocyanate; P-E is pre-exposure method of treatment; and PR is the preservative used. Further comments on each sample from Table 1 are provided in Table 1S. In the tables Provisional Example # is a reference to the corresponding example in U.S. Provisional Application No. 63/140,160 filed Jan. 21, 2021 and U.S. Provisional Application No. 63/231,890 for color photographs.

The effects of cyclic ketone shelf-life extenders are provided in Table 2. In Table 2 the following abbreviations are used: CH: Cycloheptanone; CY: Cyclohexanone; 2CY: 2-Cyclohexen-1-one; CP: Cyclopentanone; MCP: 1-Methylcyclopentene; 2MC: 2-Methylcyclohexanone; P-E: pre-exposure method of treatment. Further comments on each sample from Table 2 are provided in Table 2S.

The effects of chelating agents (ligands) shelf-life extenders are provided in Table 3. In Table 3 the following abbreviations are used: AA: Acetylacetone; ED: Ethylenediamine and P-E: pre-exposure method of treatment. Further comments on each sample from Table 3 are provided in Table 3S.

The effects of boronic acid shelf-life extenders are provided in Table 4. In Table 4 the following abbreviations are used: 4TBPBA: 4-tert-Butylphenylboronic acid; 4BPBA: 4-Bromophenylboronic acid; 3ClPBA: 3-Chlorophenylboronic acid; 3MPBA: 3-Methoxyphenylboronic acid; PBA: Phenylboronic acid and P-E: pre-exposure. Further comments on each sample from Table 4 are provided in Table 4S.

The effects of other and natural shelf-life extenders are provided in Table 5. In Table 5 the following abbreviations are used: AC: Ammonium carbamate; ACB: Ammonium carbaminate; ACBO: Ammonium carbonate; BE: Benzyl Ether; 2BE: 2-Butoxyethanol; CC: Choline chloride; DC: Dimethyl carbonate; DM: Dimethyl maleate; 2EE: 2-Ethoxyethanol; HS: Hydrogen sulfide; MA: Mandelic Acid; M: (−)-Menthone and P-E: pre-exposure. Further comments on each sample from Table 5 are provided in Table 5S.

The effects of a mixture of shelf-life extenders are provided in Table 6. In Table 6 the following abbreviations are used: AI: Allyl isothiocyanate; CY: Cyclohexanone; and P-E: pre-exposure. Further comments on each sample from Table 6 are provided in Table 6S.

TABLE 1

| Example # | Spoilage Criteria | PR | Food | Exposure Method | Spoilage Time - Control | Spoilage Time - Sample | Provisional Example # |
|---|---|---|---|---|---|---|---|
| 11 | Browning | AI | Coriander | 0.25 hr P-E | 11 days | 21+ days | 118 |
| 12 | Color change | AI | Paneer (A) | Sachet | 9 days | 10+ days | 34 |
| 13 | Color change | AI | Red cabbage juice (B) | 0.02 g | 12 days | 13 days | 141 |
| 14 | Color change | AI | Blackberry juice (C) | 0.02 g | 5 days | 12 days | 142 |
| 15 | Color change | AI | Tindora (D) | 2 hrs P-E | 6 days | 17 days | 103 |
| 16 | Cream | AI | Raw cow milk | 0.07 g | 3 days | 24 days | 148 |
| 17 | Curdling | AI | Milk (pasteurized, whole milk) | 0.10 g | 2 days | 16 days | 82 |
| 18 | Curdling | AI | Milk & Yogurt (whole milk & yogurt) mix | 0.10 g | 2 days | 16 days | 83 |
| 19 | Curdling | AI | Milk (pasteurized, whole milk) | 0.05 g | 2 days | 28 days | 84 |
| 20 | Fungus | AI | Apple juice (E) | 0.02 g | 7 days | 13 days | 136 |
| 21 | Fungus | AI | Beet juice (F) | 0.02 g | 7 days | 13 days | 139 |
| 22 | Fungus | AI | Blueberries | 16 hrs P-E | 3 days | 24 days | 189 |
| 23 | Fungus | AI | Blueberry juice (G) | 0.02 g | 3 days | 12 days | 138 |
| 24 | Fungus | AI | Red cherries | 1 hr P-E | 2 days | 7 days | 188 |
| 25 | Fungus | AI | Broccoli | 0.25 hr P-E | 6 days | 9 days | 100 |

TABLE 1-continued

| Example # | Spoilage Criteria | PR | Food | Exposure Method | Spoilage Time - Control | Spoilage Time - Sample | Provisional Example # |
|---|---|---|---|---|---|---|---|
| 26 | Fungus | AI | Broccoli | Sachet | 6 days | 9 days | 101 |
| 27 | Fungus | AI | Broccoli | 2 hrs P-E | 5 days | 16 days | 102 |
| 28 | Fungus | AI | Carrot juice (H) | 0.02 g | 12 days | 13 days | 137 |
| 29 | Fungus | AI | Cauliflower | 0.25 hr P-E | 2 days | 4 days | 99 |
| 30 | Fungus | AI | Chickpeas | Sachet | 7 days | 9+ days | 125 |
| 31 | Fungus | AI | Cucumbers | 0.20% solution | 5 days | 19 days | 111 |
| 32 | Fungus | AI | Farmer's cheese (I) | 0.5 hr P-E | 5 days | 34 days | 157 |
| 33 | Fungus | AI | Fresh, raw, shelled undried peanuts | Sachet | 18 days | 46 days | 88 |
| 34 | Fungus | AI | 5.3% Gelatin, 175 bloom in water | 0.25 ml of 0.42% solution | 9 days | 47 days | 92 |
| 35 | Fungus | AI | 5.3% Gelatin, 175 bloom in water | Sachet | 9 days | 47 days | 93 |
| 36 | Fungus | AI | Green grape juice (J) | 0.02 g | 7 days | 30 days | 134 |
| 37 | Fungus | AI | 4% Guar Gum in water | Sachet | 5 days | 47 days | 94 |
| 38 | Fungus | AI | Guar beans | 1 hr P-E | 6 days | 40 days | 97 |
| 39 | Fungus | AI | Guar beans | 2 hrs P-E | 6 days | 17 days | 98 |
| 40 | Fungus | AI | Honeydew juice (K) | 0.02 g | 12 days | 30 days | 133 |
| 41 | Fungus | AI | Karela (L) | 2 hrs P-E | 7 days | 33 days | 107 |
| 42 | Fungus | AI | Lychee | 0.5 hr P-E | 7 days | 11 days | 191 |
| 43 | Fungus | AI | Mixed Legumes | 64 hrs P-E, 6 hrs soaking, dilute | 11 days | 17 days | 62 |
| 44 | Fungus | AI | Mixed Legumes | 64 hrs P-E, 6 hrs soaking | 11 days | 17 days | 63 |
| 45 | Fungus | AI | Monterey cheese | Sachet | 7 days | 10+ days | 33 |
| 46 | Fungus | AI | Parval (M) | 2 hrs P-E | 9 days | 16 days | 108 |
| 47 | Fungus | AI | Pomegranate juice (N) | 0.02 g | 7 days | 13 days | 140 |
| 48 | Fungus | AI | Puri (O) | 16 hrs P-E | 5 days | 70+ days | 26 |
| 49 | Fungus | AI | Raspberry | 1 hr P-E | 5 days | 9 days | 13 |
| 50 | Fungus | AI | Raspberry | 0.33 hr P-E | 5 days | 31 days | 14 |
| 51 | Fungus | AI | Raw milk cheddar cheese | 1 hr P-E & Sachet | 6 days | 35 days | 160 |
| 52 | Fungus | AI | Red grape juice (P) | 0.02 g | 13 days | 13 days | 135 |
| 53 | Fungus | AI | Rotala (Q) | 16 hrs P-E | 5 days | 70+ days | 28 |
| 54 | Fungus | AI | Shelled peanuts | 0.42% solution | 5 days | 8 days | 71 |
| 55 | Fungus | AI | Sprouted Mung | Sachet | 7 days | 24 days | 67 |
| 56 | Fungus | AI | 26.7% Starch solution in water | 0.25 ml of 0.42% solution | 5 days | 47 days | 95 |
| 57 | Fungus | AI | 26.7% Starch solution in water | Sachet | 5 days | 47 days | 96 |
| 58 | Fungus | AI | Strawberries | 5 hrs P-E | 2 days | 15 days | 190 |
| 59 | Fungus | AI | Tindora | 2 hrs P-E | 6 days | 40 days | 105 |
| 60 | Fungus | AI | Tofu | Sachet | 6 days | 9+ days | 31 |
| 61 | Fungus | AI | Tomato juice (R) | 0.02 g | 3 days | 20 days | 132 |
| 62 | Fungus | AI | Unshelled peanuts | 5 ml of 0.42% solution | 5 days | 8 days | 72 |
| 63 | Fungus | AI | Wild Rice | 5 ml of 10% allyl isothiocyanate solution in water | 11 days | 21 days | 54 |
| 64 | Fungus | AI | Wild Rice | Sachet | 11 days | 21 days | 55 |
| 65 | Gassed dome | AI | Orange juice (S) | 0.02 g | 4 days | 12 days | 143 |
| 66 | Germination | AI | Mixed Legumes (T) | 0.10 g | 3 days | 9 days | 59 |

TABLE 1-continued

| Example # | Spoilage Criteria | PR | Food | Exposure Method | Spoilage Time - Control | Spoilage Time - Sample | Provisional Example # |
|---|---|---|---|---|---|---|---|
| 67 | Germination | AI | Mixed Legumes | Sachet | 4 days | 21 days | 58 |
| 68 | Germination | AI | Mixed Legumes | Sachet | 3 days | 9 days | 60 |
| 69 | Germination | AI | Soft White Wheat | Sachet | 4 days | 21 days | 53 |
| 70 | Germination | AI | Soft White Wheat | 5 ml of 10% allyl isothiocyanate solution in water | 4 days | 21 days | 52 |
| 71 | Germination | AI | Unshelled Rice | Sachet | 3 days | 15 days | 56 |
| 72 | Odor | AI | White rice | 5 ml of 10% allyl isothiocyanate solution in water | 5 days | 21 days | 50 |
| 73 | Odor | AI | White rice | Sachet | 5 days | 21 days | 51 |
| 74 | Rise of dough | AI | Freshly prepared dough for bread | 1% in 100 g flour | N/A | N/A | 86 |
| 75 | Shriveling | AI | Parval | 0.5 hr P-E | 4 days | 4+ days | 109 |
| 76 | Shriveling | AI | Parval | 1 hr P-E | 4 days | 4+ days | 110 |
| 77 | Softening | AI | Avocado | 0.25 hr P-E | 2 days | 2 days | 42 |
| 78 | Softening | AI | Avocado | 2 hrs P-E | 2 days | 2 days | 43 |
| 79 | Sprouting | AI | Red Potatoes | 2 hrs P-E | 9 days | 16 days | 73 |
| 80 | Sprouting | AI | Mix of red, purple and yellow potatoes | 4 hrs P-E | 22 days | 46 days | 166 |
| 81 | Sprouting | AI | Fingerling Potatoes | 2 hrs P-E | 37 days | 59 days | 167 |
| 82 | Sprouting | AI | Sprouted Garlic | 0.5 hr P-E | 4 days | 4+ days | 173 |
| 83 | Wet | AI | Methi (U) | 1 hr P-E | 9 days | 30 days | 120 |
| 84 | Cream | EI | Raw cow milk | 0.07 g | 3 days | 24 days | 148 |
| 85 | Fungus | EI | Tomato juice | 0.02 g | 4 days | 27 days | 145 |
| 86 | Solid | EI | Pasteurized whole milk | 0.05 g | 3 days | 14 days | 152 |
| 87 | Fungus | PI | White pearl onions | Sachet | 8 days | 48 days | 171 |
| 88 | Fungus | PI | Yellow pearl onions | Sachet | 24 days | 48 days | 168 |
| 89 | Fungus | AI & Humidity | Mixed Legumes | 64 hrs P-E AI, 6 hrs soaking in water | 11 days | 17 days | 65 |

TABLE 1S

| Example # | Comments |
|---|---|
| 11 | Coriander loses its bright green color but never becomes yellow or wilts with allyl isothiocyanate. Other spoilage criteria include becoming wet or wilty. |
| 12 | Other cheeses were also tried with cyclohexanone, hydrogen sulfide, allyl isothiocyanate, and ammonium carbonate. |
| 13 | Other criteria for spoilage includes fungus growth. |
| 14 | Other criteria for spoilage includes fungus growth. |
| 15 | Another criteria for spoilage includes fungus growth. |
| 16 | Another spoilage criteria includes the growth of fungus. |
| 17 | The treated sample's pH was 5. Another criteria for spoilage include a bad odor. |
| 18 | The pH of the treated sample was 4.5 at room temperature at 16 days. Another criteria of spoilage includes a bad odor. |
| 19 | An additional spoilage criteria includes a bad odor. |
| 20 | Another criteria for spoilage includes a color change. |
| 21 | Another criteria for spoilage includes a color change. |
| 22 | Other preservatives tested include: acetylacetone, hydrogen sulfide, 2-cyclohexen-1-one and cyclohexanone. |
| 23 | The treated sample just had some settlement on the bottom but no fungus. Another criteria for spoilage includes a color change. |

TABLE 1S-continued

| Example # | Comments |
|---|---|
| 24 | Other preservatives tested include: acetylacetone, cyclohexanone and 2-cyclohexen-1-one. Tests were done with and without humidity. |
| 25 | Other criteria for spoilage include an unpleasant odor, a color change and wilting. |
| 26 | Other criteria for spoilage include an unpleasant odor, a color change and wilting. |
| 27 | Broccoli was tested with preservatives such as cyclohexanone, ammonium carbamate, cycloheptanone, cyclopentanone, 2-methylcyclohexanone, 4-methylcyclohexanone, (±)-camphor, (−)-menthone, allyl isothiocyanate, acetylacetone, 1-methylcyclopentene and 2-cyclohexen-1-one. Other criteria for spoilage include an unpleasant odor, a color change and wilting. |
| 28 | The control sample also emitted a rotten odor. Another criteria for spoilage includes a color change. |
| 29 | Cauliflower in the control group also emitted an odor within 2 days. Cauliflower has been tried with cyclohexanone, hydrogen sulfide, allyl isothiocyanate, and ammonium carbonate. |
| 30 | Chickpeas have been tried with acetylacetone, allyl isothiocyanate, 1-methylcyclopentene, and 2-cyclohexen-1-one. Another criteria for spoilage includes a color change. |
| 31 | Other criteria for spoilage include shriveling and wilting. |
| 36 | The control sample formed bubbles/foam on top and created a gassed dome. Other criteria for spoilage include a color change and unpleasant odor. |
| 39 | Guar beans were tested with cyclohexanone, daikon piece, ginger piece, horseradish piece, ammonium acetate, ammonium carbamate, ammonium cabaminate, ammonium carbonate, acetylacetone, peace of wasabi, 1-methylcyclopentene and 2-cyclohexen-1-one. Guar has been dipped in solutions of diethylene glycol monoethyl ether, ethylenediaminetetraacetic acid-sodium salt, malic acid, mandelic acid, pyrogallic acid, daikon juice, ginger juice and horseradish juice. |
| 40 | Another criteria for spoilage includes a color change or an unpleasant odor. |
| 41 | Karela has been tried with cyclohexanone, hydrogen sulfide, allyl isothiocyanate, and ammonium carbonate. Another spoilage criteria is yellowing. |
| 42 | Cyclohexanone and acetylacetone were also tested. |
| 43 | 10 ml was added to jar after exposure method. Other criteria for spoilage include germination and an unpleasant odor. |
| 44 | Water was added to jar after exposure method. Other criteria for spoilage include germination and an unpleasant odor. |
| 46 | Another spoilage criteria is yellowing. |
| 47 | Another criteria for spoilage includes a color change. |
| 48 | There was very little change in color and softness of puri even after 70 days. Other preservative tried were cyclohexanone and allyl isothiocyanate. |
| 51 | Results were the same regardless of exposure method. |
| 52 | After 5 days, the control sample began to lose its color and some foam appeared on top. At 13 days, there was a layer of fungus on top of the control sample and it had a bad odor. No change in the treated sample. Other criteria for spoilage includes a color change or an unpleasant odor. |
| 53 | There was very little change in color and softness of millet bread even after 70 days. |
| 54 | Shelled peanuts were pre-soaked in water overnight, dried then 5 ml of solution was added into jar. Other shelf-life extenders tested with cyclohexanone, 2-cyclohexen-1-one and 1-methylcyclopentene. |
| 55 | Other criteria for spoilage include an unpleasant odor as well as sliminess. |
| 57 | Other shelf-life extenders tried with water soluble polymers were cyclohexanone, hydrogen sulfide and ammonium carbamate. |
| 58 | Acetylacetone, cyclohexanone, 1-methylcyclopentene, hydrogen sulfide and 2-cyclohexen-1-one were also tested with strawberries as well as the pre-exposure and sachet method. Tests were done with and without humidity. |
| 59 | Another criteria for spoilage includes a change of color from green to red (ripening). |
| 60 | Cyclohexanone, hydrogen sulfide, allyl isothiocyanate and ammonium carbonate were tested as shelf-life extenders for tofu. |
| 62 | Unshelled peanuts were also tested with cyclohexanone, 2-cyclohexen-1-one and 1-methylcyclopentene. |
| 63 | Wild rice was soaked in water and drained before adding shelf-life extender. |
| 64 | Wild rice in the control group also emitted a bad odor and was mushy. |
| 65 | The control sample produced a gas with an unpleasant odor and the lid domed every day after 2 days. Another criteria for spoilage includes a color change. |
| 66 | Mixed legumes were pre-soaked in water overnight, drained and placed into containers with 50 ml water and shelf-life extender. Other criteria for spoilage includes fungus growth, an unpleasant odor and/or softening/becoming mushy. |
| 67 | Mixed legumes were pre-soaked in water overnight, drained and placed into containers with 10 ml water and shelf-life extender. Other criteria for spoilage includes fungus growth, an unpleasant odor and/or softening/becoming mushy. |
| 68 | Mixed legumes were pre-soaked in water overnight and drained. Other criteria for spoilage includes fungus growth, an unpleasant odor and/or softening/becoming mushy. |
| 69 | Soft white wheat was soaked in water for a few hours and drain before exposed to shelf-life extender. It was also tested with ethylenediamine, ammonium hydroxide, and acetylacetone. |
| 70 | Soft white wheat was soaked in water and drained before adding shelf-life extender. |
| 71 | Unshelled rice was soaked in water for 16 hours and drained before exposing to shelf-life extender. |

TABLE 1S-continued

| Example # | Comments |
|---|---|
| 72 | White rice was pre-soaked in water overnight and drained before adding shelf-life extender. Other criteria of spoilage include becoming soft, mushy, soggy and/or yellowing |
| 73 | White rice was pre-soaked in water overnight and drained before adding shelf-life extender. Other criteria of spoilage include becoming soft, mushy, soggy and/or yellowing |
| 74 | The percent of allyl isothiocyanate was not optimized but the results indicate that allyl isothiocyanate is capable of killing yeast. |
| 75 | Parval has been tried with allyl isothiocyanate, dried wasabi, and acetylacetone. |
| 76 | Parval has been tried with allyl isothiocyanate, dried wasabi, and acetylacetone. |
| 77 | Other criteria for spoilage includes shriveling, wilting and browning. |
| 78 | Other criteria for spoilage includes shriveling, wilting and browning. |
| 79 | White, yellow and red potatoes were also tested with cyclohexanone, hydrogen sulfide, ammonium carbamate, cycloheptanone, cyclopentanone, 2-methylcyclohexanone, 4-methylcyclohexanone, (±)-camphor, and (−)-menthone |
| 81 | After 25 days, potatoes were placed in an open container. |
| 83 | Another criteria of spoilage includes wilting. |
| 84 | Another spoilage criteria includes the growth of fungus. |
| 86 | Other criteria for spoilage include fungus growth, separation of liquids, curdling, and/or becoming thick in consistency. |
| 87 | Placed sachet in closed container with 100% relative humidity. Another criteria for spoilage includes sprouting. |
| 88 | Placed sachet in closed container with 100% relative humidity. Another criteria for spoilage includes sprouting. |
| 89 | Water was added to cover mixed legumes after exposure method. Other spoilage criteria include smelly and mushy. |

TABLE 2

| Example # | Spoilage Criteria | Preservative | Food | Exposure Method | Spoilage Time - Control | Spoilage Time - Sample | Provisional Example # |
|---|---|---|---|---|---|---|---|
| 91 | Fungus | CH | Blueberry | Sachet | 5 days | 67 days | 20 |
| 92 | Browning | CY | Coriander | Sachet | 11 days | 11+ days | 116 |
| 93 | Fungus | CY | Raspberry | Sachet | 5 days | 9 days | 12 |
| 94 | Fungus | CY | Blueberry | Sachet | 3 days | 73 days | 17 |
| 95 | Fungus | CY | Blueberry | Sachet | 5 days | 67 days | 19 |
| 96 | Fungus | CY | Farmer's cheese | 0.5 hr P-E | 5 days | 34 days | 157 |
| 97 | Fungus | CY | Horseradish | 1 hr P-E | 6 days | 19 days | 179 |
| 98 | Fungus | CY | Lychee | Sachet | 3 days | 31 days | 23 |
| 99 | Fungus | CY | Cheesecake | Sachet | 6 days | 8+ days | 24 |
| 100 | Fungus | CY | Puri | 16 hrs P-E | 5 days | 70+ days | 25 |
| 101 | Fungus | CY | Rotala | 16 hrs P-E | 5 days | 70+ days | 27 |
| 102 | Fungus | CY | Monterey cheese | Sachet | 7 days | 10+ days | 32 |
| 103 | Fungus | CY | Coconuts | Sachet | 11 days | 25 days | 176 |
| 104 | Fungus | CY | Cucumbers | 1 hr P-E | 4 days | 21 days | 112 |
| 105 | Fungus | CY | Boiled fresh peanuts | Sachet | 7 days | 16 days | 90 |
| 106 | Ripening | CY | Green tomato | 2 hrs P-E | 10 days | 18 days | 46 |
| 107 | Softening | CY | Florida avocado | 2 hrs P-E | 2 days | 2 days | 45 |
| 108 | Softening | CY | Avocado | 2 hrs P-E | 2 days | 2 days | 40 |
| 109 | Fungus | 2CY | Raw milk mozzarella cheese | 1 hr P-E | 6 days | 24 days | 159 |
| 110 | Fungus | 2CY | Sprouted Mung | 0.02 g in 10 ml water | 7 days | 12 days | 70 |
| 111 | Germination | 2CY | Mixed Legumes | 64 hrs P-E | 3 days | 3 days | 57 |
| 112 | Ripeness | 2CY | Papaya | 2 hrs P-E | 7 days | 11 days | 174 |
| 113 | Softening | 2CY | Avocado | 2 hrs P-E | 2 days | 2 days | 41 |
| 114 | Yellowing | 2CY | Coriander | 1 hr P-E | 10 days | 10+ days | 114 |
| 115 | Fungus | CP | Strawberry | Sachet | 2 days | 5 days | 9 |
| 116 | Fungus | MCP | Cucumbers | 1 hr P-E | 4 days | 21 days | 113 |
| 117 | Fungus | 2MC | Blueberry | Sachet | 5 days | 67 days | 21 |

TABLE 2S

| Example # | Comments |
|---|---|
| 92 | Other spoilage criteria include wilting and becoming wet. |
| 98 | Other shelf-life extenders tested include: cyclohexanone, hydrogen sulfide, leek & leek leaves, radish and radish leaves, daikon piece, collard green stem and methi leaves. |
| 99 | Cheesecake was also tested with cyclohexanone, hydrogen sulfide, allyl isothiocyanate and ammonium carbonate. |
| 103 | Placed with sachet in closed container with 100% relative humidity. 2-Cyclohexen-1-one was also tested with coconuts. |
| 104 | Other spoilage criteria includes shriveling and wilting. |
| 105 | Other spoilage criteria includes darkening. |
| 107 | Other spoilage criteria include shriveling, wilting and/or browning. |
| 108 | Other spoilage criteria include shriveling, wilting and/or browning. |
| 110 | Sprouted mung with 1 drop of 2-cyclohexen-1-one in 10 ml water had no change at 12 days. Sprouted mung were also tested with wasabi (sliced/grinded), cyclohexanone and 1-methyl-1-cyclopentene. Other spoilage criteria include sliminess, an unpleasant odor and/or becoming soft or mushy. |
| 111 | After exposure, mixed legumes were soaked in water overnight, drained, and then 10 mL of water was added to a closed container. Other spoilage criteria includes growth of fungus and an unpleasant odor. |
| 113 | Other spoilage criteria include shriveling, wilting and/or browning. |
| 114 | Other spoilage criteria include wilting and becoming wet. |
| 115 | Other spoilage criteria include a loss of water, wilting and a color change. |
| 116 | Other spoilage criteria include shriveling and wilting. |

TABLE 3

| Example # | Spoilage Criteria | Preservative | Food | Exposure Method | Spoilage Time - Control | Spoilage Time - Sample | Provisional Example # |
|---|---|---|---|---|---|---|---|
| 118 | Browning | AA | Lilies | 0.01% solution | <12 days | 12+ days | 192 |
| 119 | Color change | AA | Parsley | 0.25 hr P-E | 7 days | 21+ days | 122 |
| 120 | Fungus | AA | Farmer's cheese | 0.5 hr P-E | 5 days | 34 days | 157 |
| 121 | Fungus | AA | Horseradish | 1 hr P-E | 6 days | 19 days | 179 |
| 122 | Fungus | AA | Raw milk Ricotta cheese | Sachet | 3 days | 35 days | 158 |
| 123 | Fungus | AA | Raspberry | 1 hr P-E | 5 days | 31 days | 15 |
| 124 | Fungus | AA | Yellow pearl onions | Sachet | 24 days | 48 days | 169 |
| 125 | Fungus | AA | White pearl onions | Sachet | 8 days | 48 days | 170 |
| 126 | Ripening | AA | Green tomato | 2 hrs P-E | 14 days | 18 days | 47 |
| 127 | Rotten inside | AA | Avocado | 1 hr P-E | 7 days | 9 days | 186 |
| 128 | Rotten inside | AA | Haas Avocado | 1 hr P-E | 11 days | 11 days | 187 |
| 129 | Sprouting | AA | Small yellow potatoes | Sachet | 8 days | 48+ days | 162 |
| 130 | Wilting | AA | Coriander | 1 hr P-E | 11 days | 21+ days | 117 |
| 131 | Color change | ED | Parsley | 0.25 hr P-E | 7 days | 22+ days | 123 |
| 132 | Ripening | ED | Banana | 0.25 hr P-E | 18 days | 21+ days | 49 |

TABLE 3S

| Example # | Comments |
|---|---|
| 118 | Other spoilage criteria including wilting, discoloration and dehydration. Other shelf-life extenders include cyclohexanone, 2-cyclohexen-1-one, 1-methylcyclopentene, 3-methoxyphenylboronic acid, 3-chlorophenylboronic acid, benzyl ether, choline chloride and hydrogen sulfide. Other flowers tested include marigold, salvia, vinca, daffodils, gerbera, roses, carnations, pompoms, alstroemeria, baby's breath, |

TABLE 3S-continued

| Example # | Comments |
|---|---|
| | hydrangea, large tree leave, small tree leave, green vines, lavender, small purple and red garden flowers, walnut leaves, clovers, mug wort, pokeweed, chamomile, allium, yarrow, bee balm, daisy, tradescantia, malva and clematis multi blue. |
| 119 | Parsley in the control group became yellow and brown. Another spoilage criteria includes wilting. |
| 122 | Discoloration is another spoilage criteria. |
| 123 | Raspberries were also tested with cyclohexanone, allyl isothiocyanate and acetylacetone. Another spoilage criteria is a loss of water from the produce. |
| 124 | Another spoilage criteria includes sprouting. |
| 125 | Another spoilage criteria includes sprouting. |
| 126 | Green tomatoes were also exposed to allyl isothiocyanate, 1-methylcyclopentene, 2-cyclohexen-1-one, 2-butoxyethanol, dimethyl carbonate, dimethyl maleate, dimethyl malonate, 4-hydroxy-4-methyl-2-pentatanone, dibutyl adipate, diethyl malate, diethyl malonate, and 2-ethoxyethanol. |
| 129 | Sachet placed inside container with 100% relative humidity. |
| 130 | Other spoilage criteria include color browning or yellowing. |
| 131 | Another spoilage criteria includes wilting. |
| 132 | Other spoilage criteria includes brown spots. Bananas were also tested with cyclohexanone, hydrogen sulfide, ammonium carbamate, cycloheptanone, cyclopentanone, 2-methylcyclohexanone, 4-methylcyclohexanone, (±)-camphor, (−)-menthone, allyl isothiocyanate, acetylacetone and a piece of wasabi. |

TABLE 4

| Example # | Spoilage Criteria | Preservative | Food | Exposure Method | Spoilage Time - Control | Spoilage Time - Sample | Provisional Example # |
|---|---|---|---|---|---|---|---|
| 133 | Fungus | 4TBPBA | Tomato juice | 0.20 g | 4 days | 27 days | 145 |
| 134 | Fungus | 4BPBA | Raw milk yogurt | 0.10 g | 3 days | 5 days | 151 |
| 135 | Solid | 3CIPBA | Pasteurized fat free milk | 0.05 g | 3 days | 14 days | 153 |
| 136 | Fungus | 3MPBA | Orange juice with peel | 0.02 g | 4 days | 27 days | 146 |
| 137 | Color change | PBA | Lime | 2% in water sprayed | 6 days | 6+ days | |
| 138 | Fungus | PBA | Blueberry | 2% in water sprayed | 6 days | 10+ days | |
| 139 | Fungus | PBA | Strawberry | 2% in water sprayed | 6 days | 10+ days | |
| 140 | Germination | PBA | Grains | 2% in water sprayed | 2 days | 7+ days | |
| 175 | Color change | PBA | Broccoli | 2% in water sprayed | 4 days | 28 days | |
| 176 | Color change | PBA | Methi | 2% in water sprayed | 4 days | 28 days | |

TABLE 4S

| Example # | Comments |
|---|---|
| 134 | Other preservatives tested with raw milk yogurt include: allyl isothiocyanate, ethyl isothiocyanate, butylboronic acid, 4-tert-butylphenylboronic acid and 3-chlorophenylboronic acid. |
| 135 | Other spoilage criteria include growth of fungus, separation and thickness |
| 137 | Limes were also sprayed with butylboronic acid. Other spoilage criteria include fungus growth. |
| 139 | Other spoilage criteria includes loss of color and wilting. |
| 140 | Grains includes mixed legumes and soft white wheat. Other spoilage criteria includes color change of stem, stem loss and/or wilting. |

TABLE 5

| Example # | Spoilage Criteria | Preservative | Food | Exposure Method | Spoilage Time - Control | Spoilage Time - Sample | Provisional Example # |
|---|---|---|---|---|---|---|---|
| 141 | Fungus | AC | Roti | Sachet | 8 days | 80+ days | 29 |
| 142 | Fungus | ACB | Fresh, unshelled peanuts | Sachet | 5 days | 45 days | 89 |
| 143 | Color loss | ACBO | Ground Beef | Sachet | 2 days | 2+ days | 78 |
| 144 | Color loss | ACBO | Ground Chicken | Sachet | 2 days | 2+ days | 79 |
| 145 | Color loss | ACBO | Tilapia fish fillet | Sachet | 2 days | 2+ days | 80 |
| 146 | Fungus | BE | Ginger | 1 hr P-E | 12 days | 37 days | 177 |
| 147 | Expedited Ripening | 2BE | Mango | Sachet | 14+ days | 8 days | 74 |
| 148 | Fungus | 2BE | Red tomato | 2 hrs P-E | 13 days | 29 days | 48 |
| 149 | Dehydration | CC | Bok Choy | 0.08 hr soaking in 22% solution in water | 7 days | 11 days | 182 |
| 150 | Dehydration | CC | Parsley | 0.08 hr soaking in 22% solution in water | 7 days | 11 days | 183 |
| 151 | Ripening | CC | Peppers | 2 hrs soaking in 10% solution in water | 6 days | 13 days | 184 |
| 152 | Color loss | CC | Broccoli | 1 hr soaking in 5% solution in water | 1 day | 8 day | 181 |
| 153 | Ripening | CC | Jalapeño Peppers | 1 hr soaking in 10% solution in water | 3 days | 8 days | 185 |
| 154 | Sprouting | CC | Fingerling Potatoes | 2 hrs soaking in 10% solution in water | 10 days | 16 days | 165 |
| 155 | Expedited ripening | DC | Mango | Sachet | 14+ days | 8 days | 75 |
| 156 | Ripening | DM | Mango | Sachet | 16 days | 23 days | 76 |
| 157 | Ripening | 2EE | Mango | 2 hrs P-E | 16 days | 23 days | 77 |
| 158 | Browning of flesh | HS | Granny smith apples | P-E | ~5 hours | 3 days | 35 |
| 159 | Fungus | HS | Snow peas | Sachet | 6 days | 11 days | 126 |
| 160 | Fungus | HS | Snow peas | Sachet | 11 days | 15 days | 128 |
| 161 | Wet | MA | Coriander | 0.5 hr soaking in 1% solution in water | 7 days | 7+ days | 115 |
| 162 | Shriveling | M | Radish | 2 hrs P-E | 5 days | 5 days | 129 |
| 163 | Fungus | Daikon | Strawberry | Piece | 2 days | 6 days | 10 |
| 164 | Fungus | Daikon juice | Carrot | 1 hr soaking in 8% solution in water | 14 days | 14 days | 131 |
| 165 | Fungus | Ginger | Blueberry | Piece | 3 days | 11 days | 18 |
| 166 | Fungus | Ginger | Snow peas | Piece | 6 days | 11 days | 127 |
| 167 | Fungus | Ginger juice | Mandarins | 1 hr soaking in 8% solution in water | 14 days | 30 days | 36 |
| 168 | Fungus | Wasabi | Mandarins | Piece | 14 days | 30 days | 37 |

TABLE 5S

| Example # | Comments |
|---|---|
| 143 | Color loss included loss of pinkish, fleshy color. |
| 144 | Color loss included loss of fleshy color. |
| 145 | Color loss included loss of fleshy color. |
| 148 | Red tomatoes were also tested with 2-butoxyethanol, dimethyl carbonate, dimethyl maleate, dimethyl malonate, 2-cyclohexen-1-one, and 4-hydroxy-2-butanone. |
| 149 | Another criteria for spoilage includes a loss of green color. |
| 150 | Another criteria for spoilage includes a loss of green color. |
| 151 | Another criteria for spoilage includes a dehydration. |
| 152 | Another criteria for spoilage includes wilting. |
| 153 | Another criteria for spoilage includes a dehydration. |
| 157 | Mangoes were tested with cyclohexanone, allyl isothiocyanate, 1-methylcyclopentene, 2-cyclohexen-1-one, 2-butoxyethanol, dimethyl carbonate, dimethyl maleate, dimethyl malonate, dibutyl adipate, 2-ethoxyethanol, and acetylacetonate. |
| 158 | Apples were also exposed to allyl isothiocyanate and cyclohexanone. |
| 159 | Another spoilage criteria includes the loss of green color. |
| 160 | Another spoilage criteria includes the loss of green color. Snow peas have been tried with cyclohexanone, daikon piece, ginger piece, horseradish piece, hydrogen sulfide, allyl isothiocyanate, 1-methylcyclopentene, and 2-cyclohexen-1-one. |
| 161 | Other spoilage criteria include browning and becoming wilty. |
| 162 | Radish has been tried with cyclohexanone, Hydrogen sulfide, ammonium carbamate, cycloheptanone, cyclopentanone, 2-methylcyclohexanone, 4-methylcyclohexanone, (±)-camphor, (−)-menthone, allyl isothiocyanate. Radish has been dipped in solutions: magnesium acetate tetrahydrate, magnesium chloride hexahydrate, magnesium hydroxide, magnesium phosphate dibasic trihydrate, magnesium stearate, and magnesium sulfate heptahydrate. |
| 163 | Loss of water is another spoilage criteria. |
| 164 | Another spoilage criteria includes becoming wet. Baby Carrots have been Baby carrots have been dipped in solution of daikon juice, ginger juice, horseradish juice, and allyl isothiocyanate. |
| 166 | Another spoilage criteria includes the loss of green color. |
| 167 | Mandarins were also exposed to 2-butoxyethanol, dimethyl carbonate, dimethyl maleate, dimethyl malonate, 2-cyclohexen-1-one, and 4-hydroxy-2-butanone and by dipping/rinsing in solution of daikon juice, ginger juice, horseradish juice and allyl isothiocyanate. |

TABLE 6

| Example # | Spoilage Criteria | Preservative | Food | Exposure Method | Spoilage Time - Control | Spoilage Time - Sample | Provisional Example # |
|---|---|---|---|---|---|---|---|
| 169 | Fungus | AI & CY | Blackberry | 0.25 hr P-E | 3 days | 7 days | 16 |
| 170 | Fungus | AI & CY | Tindora | 2 hr P-E | 6 days | 17 days | 104 |
| 171 | Softening | AI & CY | Avocado | 2 hr P-E | 2 days | 2 days | 44 |
| 172 | Fungus | AI & water | Mixed Legumes | 64 hrs P-E, 6 hrs soaking | 11 days | 17 days | 64 |
| 173 | Fungus | AI & water | Sprouted Mung | 0.02 g in 10 ml water | 7 days | 12 days | 68 |
| 174 | Fungus | AI & CY & water | Sprouted Mung | 0.02 g in 10 ml water | 7 days | 12 days | 69 |

TABLE 6S

| Example # | Comments |
|---|---|
| 169 | Other preservatives tried were cyclohexanone and allyl isothiocyanate, separately. |
| 170 | Another spoilage criteria includes ripening (reddening of tindora). |
| 171 | Avocados (Mexican/Haas) have been tried with 1-methylcyclopentene, 2-cyclohexen-1-one, acetylacetone and hydrogen sulfide. Other spoilage criteria include shriveling, wilting and browning. |
| 172 | Pre-exposed with wet napkin for humidity, drained and then added 10 ml of water to closed container. Other spoilage criteria include smelly, slimy and/or mushy. |
| 173 | Other spoilage criteria include smelly, slimy and/or mushy. |
| 174 | Other spoilage criteria include smelly, slimy and/or mushy. |

The invention has been described with reference to preferred embodiments without limit thereto. One of skill in the art would realize additional embodiments which are described and set forth in the claims appended hereto.

The invention claimed is:

1. A seed with a shelf-life extender coated thereon wherein said shelf-life extender is an isothiocyanate, wherein said seed is selected from the group consisting of grains, legumes and nuts.

2. A seed of claim 1 wherein said isothiocyanate or its precursor is selected from a group consisting of allyl isothiocyanate, methyl isothiocyanate, benzyl isothiocyanate, isopropyl isothiocyanate, isobutyl isothiocyanate, propyl isothiocyanate, benzoyl isothiocyanate, cyclohexyl isothiocyanate, ethyl isothiocyanate, butyl isothiocyanate, fluorescein isothiocyanate), ethoxycarbonyl isothiocyanate, phenyl isothiocyanate, phenyl isothiocyanate, 3-iodophenyl isothiocyanate, 4-chlorophenyl isothiocyanate, 2-phenylethyl isothiocyanate, 3-bromophenyl isothiocyanate, fluorescein 5-isothiocyanate, 3-pyridyl isothiocyanate, 1-adamantyl isothiocyanate, 1-naphthyl isothiocyanate, 2-methoxyphenyl isothiocyanate, 4-nitrophenyl isothiocyanate, 4-methoxyphenyl isothiocyanate, fluorescein isothiocyanate dextran, 4-bromophenyl isothiocyanate, fluorescein 6-isothiocyanate, 2-chlorophenyl isothiocyanate, 4-cyanophenyl isothiocyanate, 4-fluorophenyl isothiocyanate, 2-fluorophenyl isothiocyanate, 3-fluorophenyl isothiocyanate, 2-chloroethyl isothiocyanate, 3,4-dimethoxyphenyl isothiocyanate, 2,4-difluorophenyl isothiocyanate, 4-(trifluoromethyl)phenyl isothiocyanate, 2-(trifluoromethyl)phenyl isothiocyanate, 3,4-dichlorophenyl isothiocyanate, 3-(trifluoromethyl)phenyl isothiocyanate, 3,5-dimethylphenyl isothiocyanate, 3-(methylthio) propyl isothiocyanate, 4-(trifluoromethoxy) phenyl isothiocyanate, 2,4-dimethylphenyl isothiocyanate, 3,4-difluorophenyl isothiocyanate, 2,4-dimethoxyphenyl isothiocyanate, 2,3-dichlorophenyl isothiocyanate, 2,4-dichlorophenyl isothiocyanate, sec-butyl isothiocyanate, n-octyl isothiocyanate, 4-penten-1-yl isothiocyanate, p-tolyl isothiocyanate, o-tolyl isothiocyanate, 3-buten-1-yl isothiocyanate, 4-dimethylamino-1-naphthyl isothiocyanate, 4-(dimethylamino) azobenzene 4'-isothiocyanate, m-tolyl isothiocyanate, 2,4,6-trimethylphenyl isothiocyanate, 3,5-bis(trifluoromethyl)phenyl isothiocyanate, 4-tert-butylphenyl isothiocyanate, 5-fluoro-o-tolyl isothiocyanate, 2,3,4,6-tetra-o-benzoyl-β-d-glucopyranosyl isothiocyanate, 2,3,4,6-tetra-o-acetyl-β-d-glucopyranosyl isothiocyanate, 4-isothiocyanato-2-(trifluoromethyl)benzonitrile, ethyl isothiocyanatoacetate, dansylamino-pitc, dl-sulforaphane, isothiocyanatocyclopropane, 1-isothiocyanato-3-nitrobenzene, 1,3-diisopropyl-2-isothiocyanatobenzene, erucin, and a mixture thereof.

3. A seed of claim 2 wherein said isothiocyanate or its precursor is selected from a group consisting of allyl isothiocyanate, benzyl isothiocyanate, butyl isothiocyanate, cyclopentyl isothiocyanate, isobutyl isothiocyanate, isopropyl isothiocyanate, methyl isothiocyanate, phenylethyl isothiocyanate, phenethyl thiocyanate, phenyl isothiocyanate, phenylpropyl thiocyanate, ethyl isothiocyanate, propyl isothiocyanate, tert-butyl thiocyanate, tert-octyl thiocyanate, cyclohexyl isothiocyanate, 1-adamantyl isothiocyanate, ethoxycarbonyl isothiocyanate, 2,3,4,6-tetra-o-acetyl-beta-D-glucopyranosyl isothiocyanate, and a mixture thereof.

4. A seed with a shelf-life extender coated thereon wherein said shelf-life extender is an isothiocyanate, wherein said seed is selected from the group consisting of alfalfa, barley, black eye bean, black gram (*Vigna mungo*), canola oil seeds, carob, chickpeas, clover, corn, cotton seed, fava beans, flaxseed, French haricot verts, green beans, guar beans, lentils, lima beans, lupins, math or moth bean (*Vigna aconitifolia*), mesquite, mungs, peanut, peas, rapeseed, red beans, red kidney bean, rice, rye, sesame seeds, soybeans, sprouted beans, sunflower, pigeon peas, urad bean, vaal or lima beans (*Phaseolus lunatus*), wheat, and yellow wax beans.

\* \* \* \* \*